US008195575B2

(12) United States Patent
Krause et al.

(10) Patent No.: US 8,195,575 B2
(45) Date of Patent: Jun. 5, 2012

(54) SYSTEMS AND METHODS FOR PROVIDING CHANGE OF ADDRESS SERVICES OVER A NETWORK

(75) Inventors: Robert Krause, Severna Park, MD (US); Wayne H. Orbke, Germantown, TN (US); Michael Selnick, Reston, VA (US); Michael Murphy, Collierville, TN (US); Harry W. Aldstadt, Woodbridge, VA (US); Audrey K. Conley Williams, Memphis, TN (US); Gerald Matthews, Germantown, TN (US); Pat Matthews, legal representative, Germantown, TN (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 12/833,699

(22) Filed: Jul. 9, 2010

(65) Prior Publication Data

US 2010/0281529 A1 Nov. 4, 2010

Related U.S. Application Data

(62) Division of application No. 09/839,241, filed on Apr. 23, 2001, now Pat. No. 7,778,840.

(60) Provisional application No. 60/198,818, filed on Apr. 21, 2000.

(51) Int. Cl.
  *G06Q 20/00* (2012.01)
(52) U.S. Cl. .................. 705/67; 705/64; 705/75
(58) Field of Classification Search ............... 705/67, 705/64, 75
  See application file for complete search history.

(56) References Cited

U.S. PATENT DOCUMENTS

| 4,970,655 | A  |   | 11/1990 | Winn et al. |
|-----------|----|---|---------|-------------|
| 5,146,403 | A  |   | 9/1992  | Goodman |
| 5,581,749 | A  | * | 12/1996 | Hossain et al. ............ 1/1 |
| 6,457,012 | B1 |   | 9/2002  | Jatkowski |
| 6,549,892 | B1 |   | 4/2003  | Sansone |
| 6,654,779 | B1 | * | 11/2003 | Tsuei ................ 718/101 |
| 6,741,724 | B1 |   | 5/2004  | Bruce et al. |
| 7,904,197 | B2 | * | 3/2011  | Wilson et al. ........... 700/224 |
| 2001/0037463 | A1 |   | 11/2001 | Salta |
| 2002/0029248 | A1 |   | 3/2002  | Cook et al. |
| 2002/0103697 | A1 |   | 8/2002  | Lockhart et al. |
| 2003/0046103 | A1 | * | 3/2003  | Amato et al. ............. 705/1 |
| 2003/0074324 | A1 |   | 4/2003  | Kresina et al. |

(Continued)

FOREIGN PATENT DOCUMENTS

EP  0 854 449  7/1998

(Continued)

OTHER PUBLICATIONS

Office Action, mailed Mar. 30, 2011, for U.S. Appl. No. 11/386,761, filed Mar. 23, 2006 (15 pages).

(Continued)

*Primary Examiner* — Pierre E Elisca
(74) *Attorney, Agent, or Firm* — Finnegan, Henderson, Farabow, Garrett & Dunner, LLP

(57) ABSTRACT

This disclosure describes systems and methods for collecting and processing change of address data and providing change of address services to a customer using a computer network. The address data can include a physical address, an electronic address, or both. The systems and methods may also provide additional services to the customer to assist in changing addresses.

9 Claims, 22 Drawing Sheets

U.S. PATENT DOCUMENTS

2006/0167822 A1    7/2006    Krause et al.
2006/0184269 A1*    8/2006    Wilson et al. ................. 700/215

FOREIGN PATENT DOCUMENTS

JP    11-298520    10/1999

OTHER PUBLICATIONS

Office Action, mailed Oct. 7, 2010, for U.S. Appl. No. 11/386,761, filed Mar. 23, 2006 (18 pages).

Office Action (Advisory Action), mailed Aug. 31, 2010, for U.S. Appl. No. 11/386,761, filed Mar. 23, 2006 (2 pages).

Anonymous, "HotData: HotData Launches New Internet Service for Automated Data Access," Dialog File 810: Business Wire, Jul. 29, 1998 (5 pages).

"Change of Address, If You're Moving—You'll Need It," https://www.movecentral.com/addresscentral/about.pl, website dated May 20, 1999 (3 pages).

"Change of Address Order Form," https://www.digiweb.com/~hth/orders.html, website dated Mar. 24, 1999 (4 pages).

"Sample Form: Change of Address Form," https;://movecentral.com/addresscentral/sample.pl, website dated May 20, 1999 (2 pages).

"CitiHabitats, Inc.—Relocation Services Division," http://www.citihabitats.com/relocations/necessities.html, website dated Mar. 24, 1999 (1 page).

Lubenow, Joe, "Postal Alert! Have You Survived Your Move Update Requirements?" Target Marketing, vol. 20, No. 8, Aug. 1997 (3 pages).

"Moving and Relocation Resources by Rent Net," http://www.rent.net/ctg/cgi-bin/Re...AK8EAAL/?brand=&Page=MovingService, website dated Apr. 18, 2000 (2 pages).

"Moving.Com—The One Stop Solution for Your Moving Needs," http://www.moving.com/, website dated Mar. 24, 1999 (1 page).

"Moving.Com—The One Stop Solution for Your Moving Needs," http://www.moving.com/advertise.asp, website dated Mar. 24, 1999 (1 page).

"National Home Connections," http://www.rent.net/ads/nhc/, website dated Apr. 18, 2000 (4 pages).

International Search Report for PCT/US01/40574, dated Nov. 19, 2001 (7 pages).

Office Action, dated Apr. 29, 2005, for U.S. Appl. No. 09/839,241, filed Apr. 23, 2001 (13 pgs.).

Office Action, dated Dec. 2, 2005, for U.S. Appl. No. 09/839,241, filed Apr. 23, 2001 (18 pgs.).

Office Action, dated Apr. 27, 2007, for U.S. Appl. No. 09/839,241, filed Apr. 23, 2001 (6 pgs.).

Office Action, dated Jan. 11, 2008, for U.S. Appl. No. 09/839,241, filed Apr. 23, 2001 (7 pgs.).

Office Action, dated Nov. 5, 2008, for U.S. Appl. No. 09/839,241, filed Apr. 23, 2001 (8 pgs.).

Office Action, dated Oct. 23, 2009, for U.S. Appl. No. 09/839,241, filed Apr. 23, 2001 (9 pgs.).

Notice of Allowance and Allowability, dated Apr. 19, 2010, for U.S. Appl. No. 09/839,241, filed Apr. 23, 2001 (6 pages), with Reply to Office Action, fled Jan. 25, 2010, including listing of allowed claims (35 pages).

Office Action, dated Oct. 5, 2009, for U.S. Appl. No. 11/386,761, filed Mar. 23, 2006 (15 pages).

Final Office Action, dated May 12, 2010, for U.S. Appl. No. 11/386,761, filed Mar. 23, 2006 (16 pages).

Office Action, dated Aug. 16, 2011, for U.S. Appl. No. 11/386,761 (17 pages).

* cited by examiner

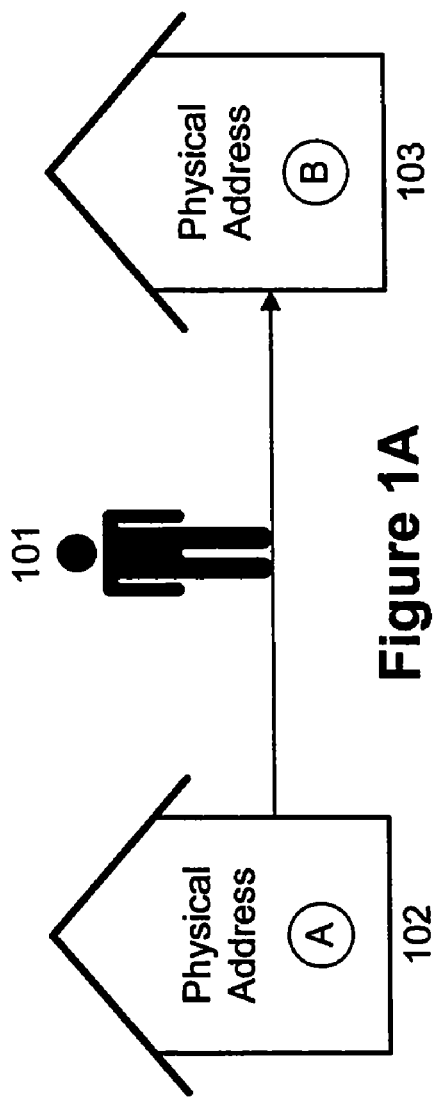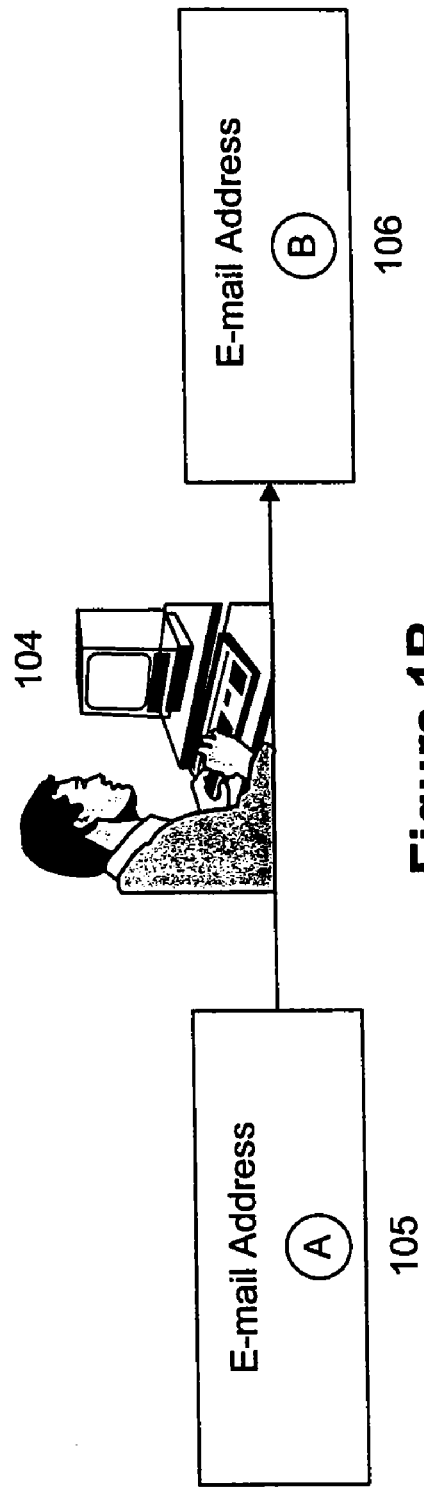

SYSTEMS AND METHODS FOR PROVIDING CHANGE OF ADDRESS SERVICES OVER A NETWORK

RELATED APPLICATION

This is a divisional of U.S. application Ser. No. 09/839,241, filed Apr. 23, 2001 now U.S. Pat. No. 7,778,840, which claims priority to U.S. Provisional Application No. 60/198,818, filed Apr. 21, 2000. This application is also related to U.S. application Ser. No. 11/386,761, filed Mar. 23, 2006. The contents of these applications are incorporated herein by reference.

I. BACKGROUND OF THE INVENTION

A. Field of the Invention

The present invention relates to systems and methods for providing change of address services to a customer. More particularly, the invention relates to systems and methods for collecting and processing change of address data and providing change of address services to a postal customer using a computer network.

B. Description of the Related Art

The United States Postal Service (USPS) is an independent government agency that provides mail delivery and other services to the public. The USPS delivers mail using a recipient's address on a mailpiece. If the address is incomplete or incorrect, mail delivery is delayed, and the USPS incurs labor and financial costs in forwarding the mailpiece to the correct address. Inaccurate addresses adversely affect the postal customer, the USPS, and the mailing industry.

Approximately forty million postal customers move each year, and each move may require a change in a postal customer's mailing address. Traditionally, a moving postal customer must complete, sign, and submit a change of address form to the USPS. The change of address form cannot be processed until the postal customer signs the form, because the signature provides authorization and orders the USPS to forward the customer's mail to the new address. Because this process relies on a physical form, it is labor intensive. The customer must sign the form and mail or carry it to a post office. USPS personnel must manually process the form, including data entry of the change of address information.

It is therefore desirable to enable postal customers to receive mail forwarding services and to notify potential mailers of a new address in a fast, efficient, and accurate manner. At the same time, moreover, it is desirable to preserve the identity validation and authorization of the customer.

II. SUMMARY OF THE INVENTION

Systems and methods consistent with the present invention overcome the shortcomings of conventional systems by collecting and processing change of address data, including identity validation, using an electronic network. Furthermore, systems consistent with the present invention provide change of address services, such as change of address notification, to the customer via the electronic network.

In an embodiment of the invention, a method for providing an electronic change of address service from an old address of a customer to a new address of the customer may include providing a user interface at a change of address server for the customer to enter change of address information, receiving the change of address information at the change of address server via a network, validating an identity of the customer at the change of address server; and processing the change of address information electronically when the identity is valid to enable the customer to receive mail addressed to the old address of the customer at the new address of the customer.

Exemplary systems and methods consistent with the present invention are recited in the attached claims. It is to be understood that both the foregoing general description and the following detailed description are exemplary and explanatory only and are not restrictive of the invention, as claimed.

III. BRIEF DESCRIPTION OF THE DRAWINGS

The accompanying drawings, which are incorporated in and constitute a part of this specification, illustrate embodiments of the invention and, together with the following description, serve to explain the principles of the invention. In the drawings:

FIGS. 1A and 1B are general block diagrams illustrating a system consistent with an embodiment of the present invention;

IV. DESCRIPTION OF THE PREFERRED EMBODIMENTS

FIGS. 1A and 1B are general block diagrams illustrating a system consistent with an embodiment of the present invention. In FIG. 1A, a postal customer (101) relocates from physical address A (102) to physical address B (103). Postal customer (101) could be anyone who receives mail through the United States Postal Service (USPS), for example, an individual, a family, a household, or a business. Typically, postal customer (101) wishes to stop receiving mail at physical address A (102) and begin receiving mail at physical address B (103).

In FIG. 1B, user (104) changes e-mail addresses from e-mail address A (105) to e-mail address B (106). User (104) could be anyone with an e-mail address, for example, an individual, a household, a business, etc. The change in e-mail address could result from a decision to change e-mail providers, a change in jobs or schools, or a number of other reasons. Typically, user (104) wishes to stop receiving e-mail at e-mail address A (105) and begin receiving e-mail at e-mail address B (106).

Figure 2:
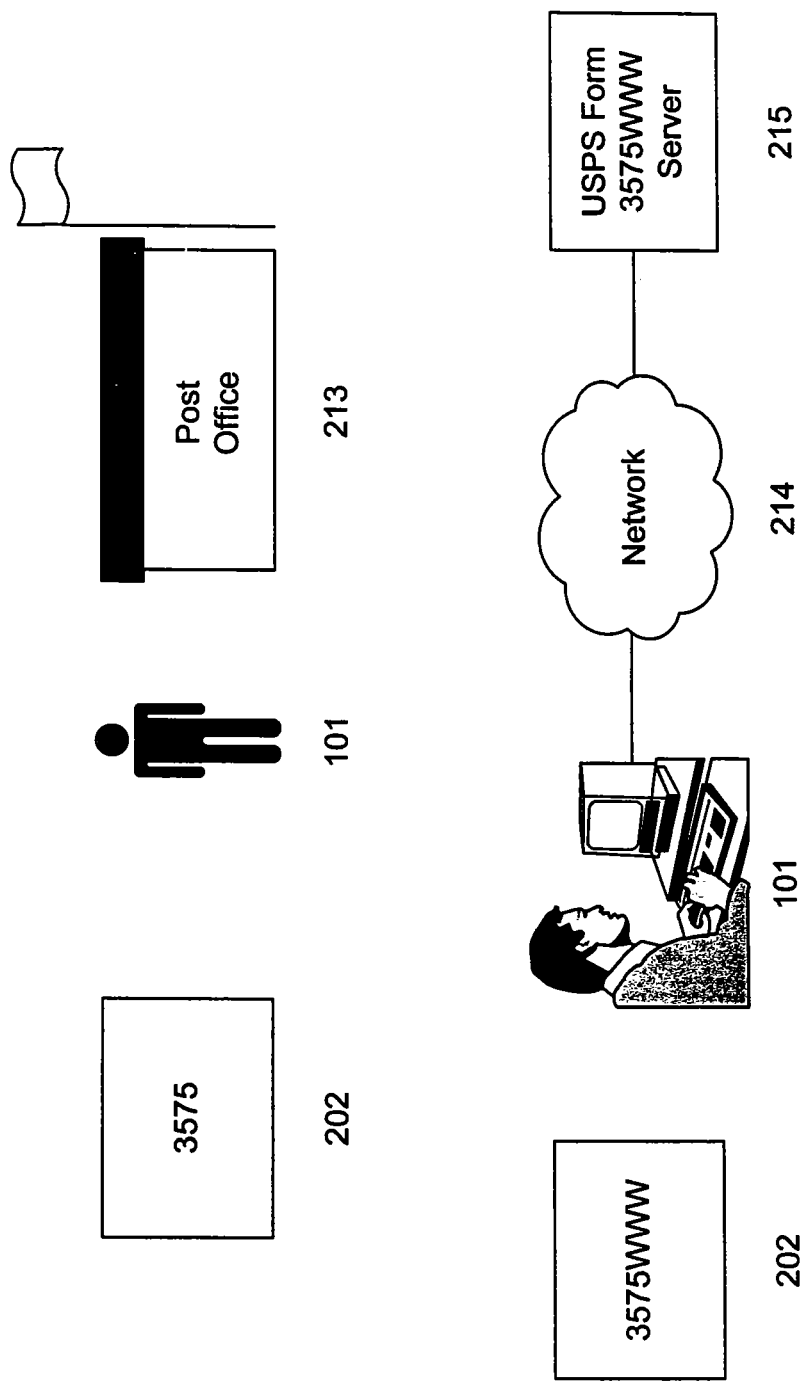
FIG. 2 is a block diagram illustrating a customer submitting a change of address request in the prior art change of address system operated by the USPS.

FIG. 2 is a block diagram illustrating a customer submitting a change of address request in a prior art change of address system operated by the USPS. The system may include a postal customer (101), a PS Form 3575 (202), a PS Form 3575WWW (202), a network (214), a USPS Form Server (215), and a Post Office (213). When postal customer (101) changes from physical address A to physical address B, as described in FIG. 1A above, postal customer (101) may complete PS Form 3575 (202) or PS Form 3575WWW (202). Form 3575 is a paper form that can be obtained from a Post Office (213) or other location. Alternatively, Form 3575WWW (202) is a form available electronically by connecting to USPS Form 3575WWW Server (215) via network (214), such as the Internet. Form 3575 (202) and Form 3575WWW (202) request the same information. Namely, both Form 3575 and Form 3575WWW request customer (101) to provide change of address information including name, old address A, new address B, effective moving date, whether the move is temporary or permanent, and whether the move is for an individual, family, or business. Regardless of how customer (101) obtains and completes Form 3575 or 3575WWW, customer (101) (or an authorized representative of the customer for the move) must physically sign the completed form and physically mail or carry it to a Post Office (213). For example, customer (101) must print, sign, and submit Form 3575WWW by mail or hand deliver the paper to a Post Office (213).

Figure 3:
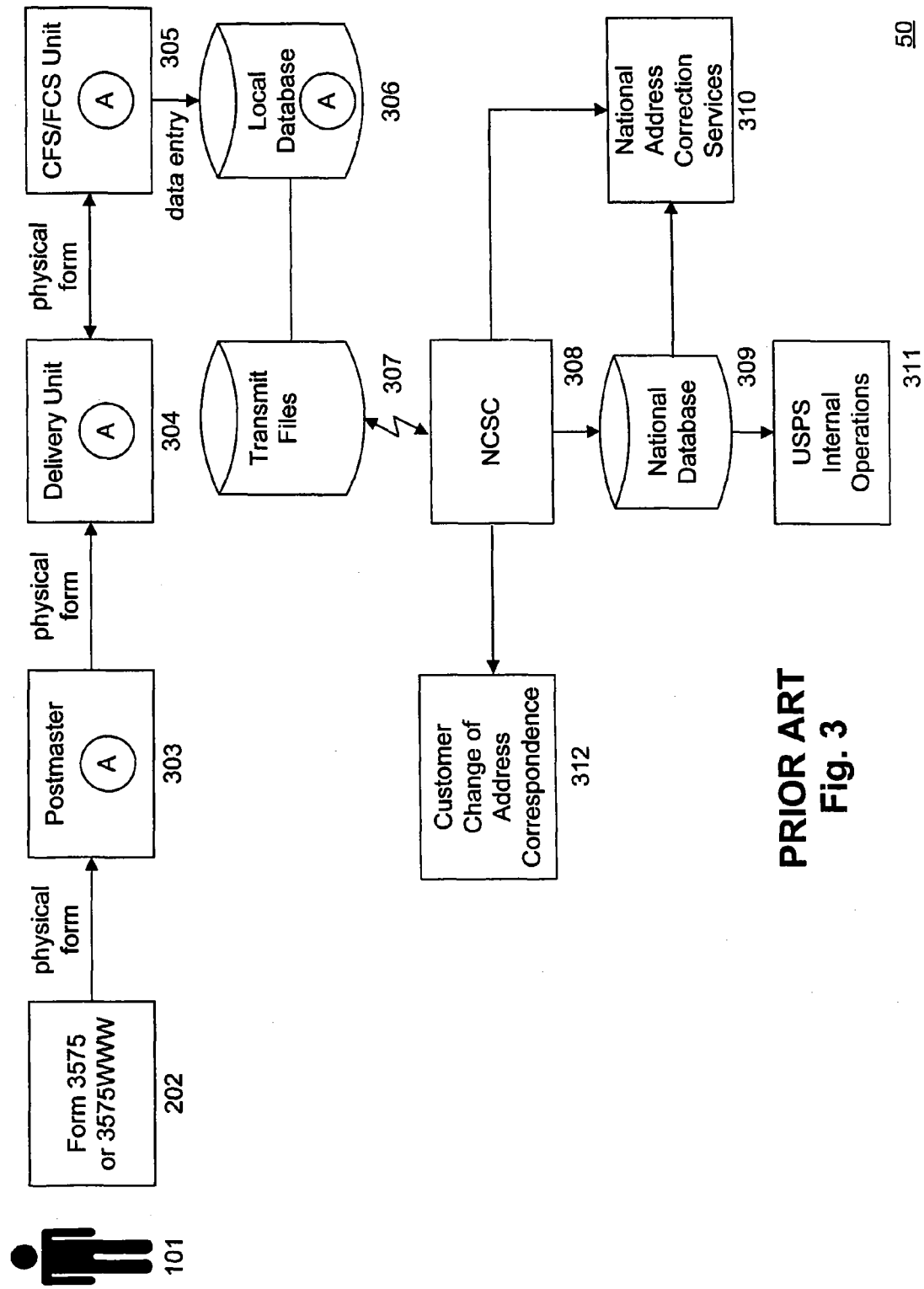
FIG. 3 is a block diagram illustrating the prior art change of address system operated by the USPS.

FIG. 3 is a block diagram illustrating the prior art change of address system operated by the USPS. FIG. 3 depicts the change of address system (50) may include a postal customer (101), Form 3575 or 3575WWW (202), a Postmaster for the area of the old address A (303), a delivery unit for address A (304), a Computerized Forwarding System (CFS) unit for address A (305), a local database for address A (306), transmit files (307), a National Customer Support Center (NCSC) (308), a national database (309), national address correction services (310), USPS internal operations (311), and customer change of address correspondence (312). Once the physical form (i.e., either the 3575 or the 3575WWW) is received at Post Office (213), it is delivered to Postmaster for the area of the old address A (303).

Postmaster for address A (303) gives the form to a delivery unit for address A (304). Delivery unit for address A (304) may include the mail carrier assigned to deliver mail to the customer's old address A. Delivery unit for address A (304) passes the form to a Computerized Forwarding System (CFS) Unit for address A (305). It is here that the change of address information from the form is first introduced into a computer. The customer's change of address information is entered manually into a local database for address A (306). There are approximately 220 CFS units with local databases in the areas served by the USPS (i.e., throughout the United States).

The local database for address A (306) creates transmit files (307) containing the customer's change of address information, and sends those files to a central processing system, e.g., the National Customer Support Center (NCSC) (308). NCSC (308) collects customer change of address information from all CFS units/local databases into a national database (309). Several different functions are served from NCSC (308) and the national database (309), including address correction services (310), USPS internal operations (311), and customer change of address correspondence (312). National address correction services (310) and customer change of address correspondence (312) are described in greater detail below with reference to FIGS. 4 and 5, respectively.

Figure 4:
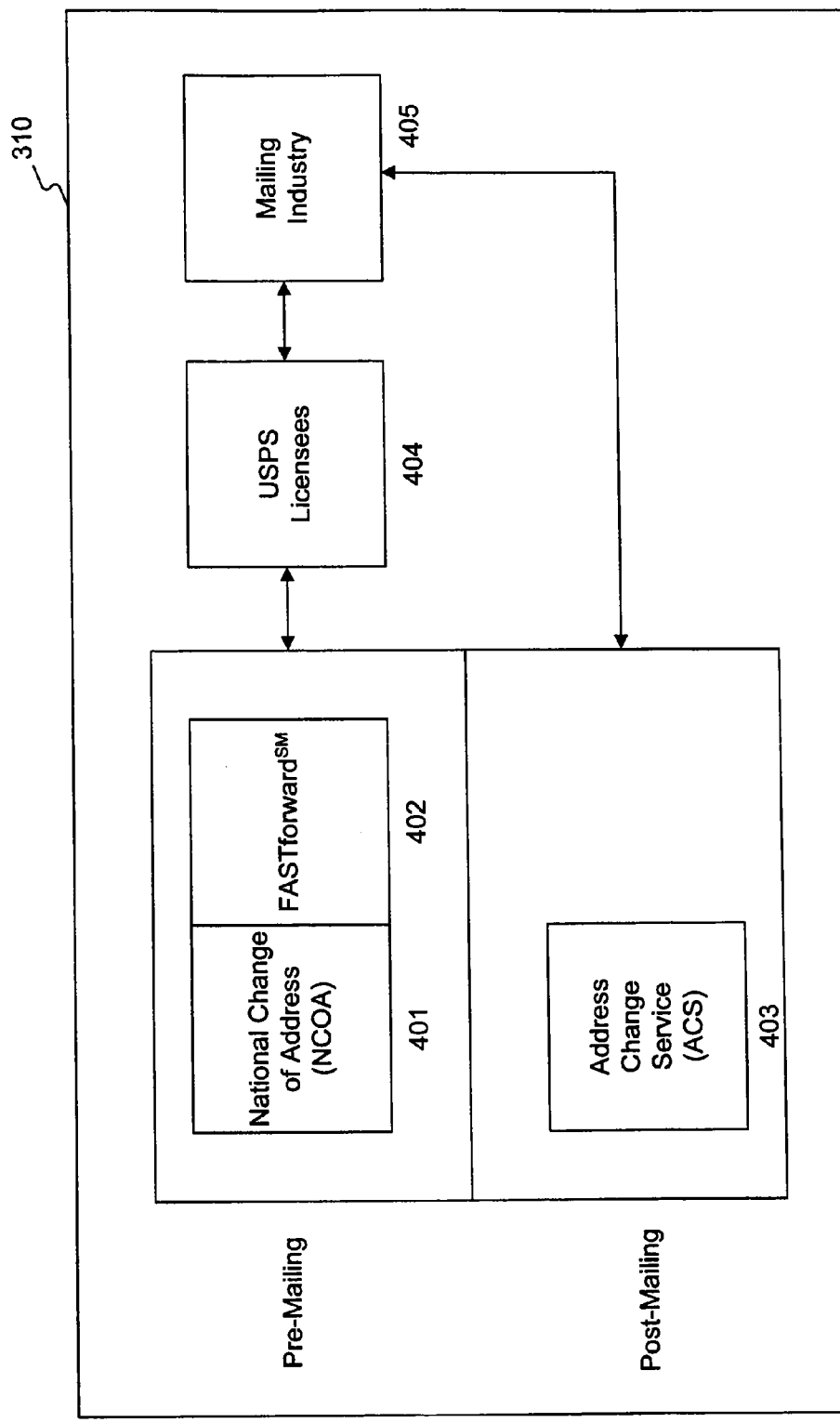
FIG. 4 is a block diagram illustrating in greater detail the national address correction services handled by the prior art USPS change of address system.

FIG. 4 is a block diagram illustrating in greater detail the national address correction services handled by the prior art USPS change of address system. National address correction services (310) offered by the USPS include pre-mailing address correction services, such as National Change of Address (NCOA) (401), and FASTforward$^{SM}$ (402), and post-mailing address correction services, such as address change service (ACS) (403). Both types of address correction services correct, standardize, and provide ZIP+4 coding for an address received by the USPS from a member of the public. However, as the names suggest, the pre-mailing services correct an address before a mailer mails a mailing piece, and the post-mailing services corrects an address after the mailer mails a mailing piece.

Another difference between the pre-mailing services and post-mailing is the entity administering the service. Specifically, USPS commercial licensees (404) offer pre-mailing services, such as National Change of Address (NCOA) (401), and FASTforward$^{SM}$ (402). Members of the mailing industry (405) may submit mailing lists to the licensees (404), who use USPS provided data to correct the given addresses. In contrast, the USPS directly administers post-mailing services, such as address change service (ACS) (403), after a mailer sends a mail piece.

Although the USPS cannot release names and addresses of postal customers to the public, the USPS can correct an address received from a member of the public, such as a mailing company, as described above. These and other USPS services rely on accurate addresses. Thus, the efficiency and cost savings of these services are necessarily limited by the speed and accuracy of the address updating process.

Figure 5:
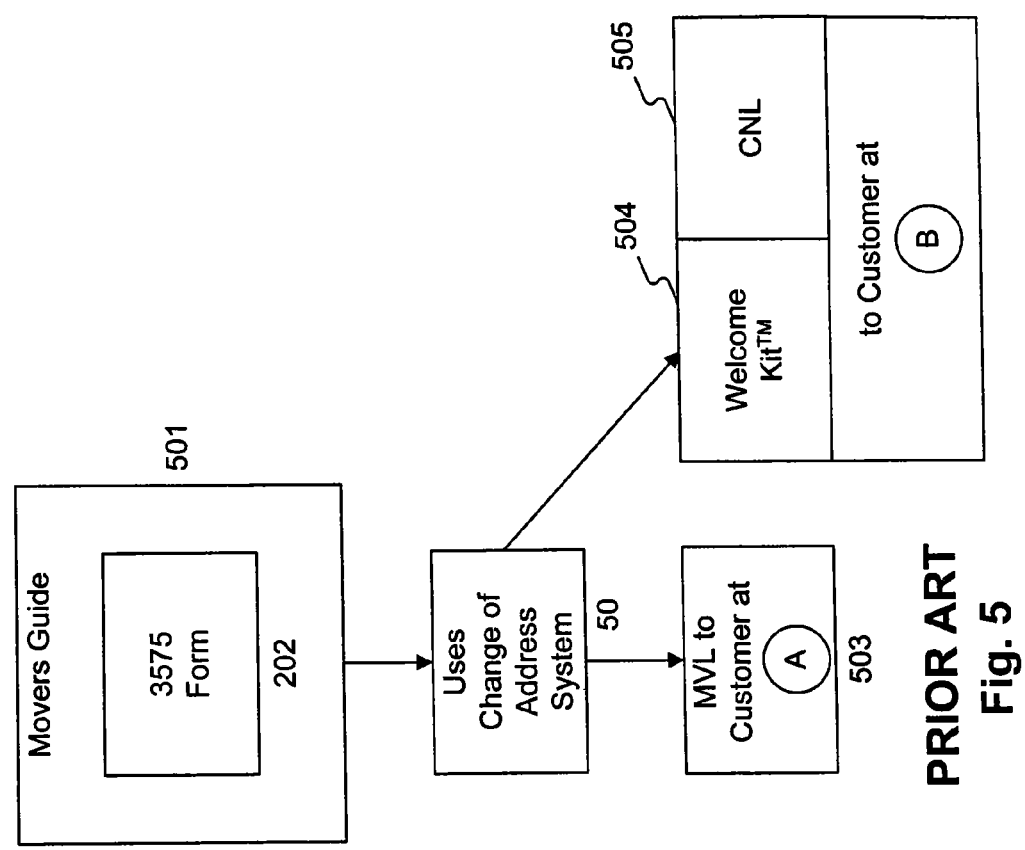
FIG. 5 is a block diagram illustrating in greater detail the customer change of address correspondence handled by the prior art USPS change of address system.

FIG. 5 is a block diagram illustrating in greater detail the customer change of address correspondence handled by the prior art USPS change of address system. The customer change of address correspondence (312) includes the documents received and submitted by the customer in the USPS change of address system (50), such as a Mover's Guide™ (501), a move validation letter (MVL) (503), and a customer notification letter (CNL) (505) or a Welcome Kit™ (504). Customer (101) may obtain Mover's Guide™ (501) from a Post Office or other source. The Mover's Guide™ contains Form 3575 (202) and may include other papers to assist customer (101) in the process of moving. As the USPS change of address system processes Form 3575, the customer receives a move validation letter (MVL) (503) at old address A. MVL (503) confirms a change of address request to forward mail as submitted in Form 3575. Additionally, the MVL helps to detect the fraudulent submission of change of address information. Customer (101) also receives either a customer notification letter (CNL) (505) or a Welcome Kit™ (504) at new address B. CNL (505) informs the customer of the old and new address information that the USPS has recorded and confirms that the USPS has processed this change of address information. The Welcome Kit™ includes the same information as the CNL and may also include other papers to assist the customer in the process of moving.

Figure 6:
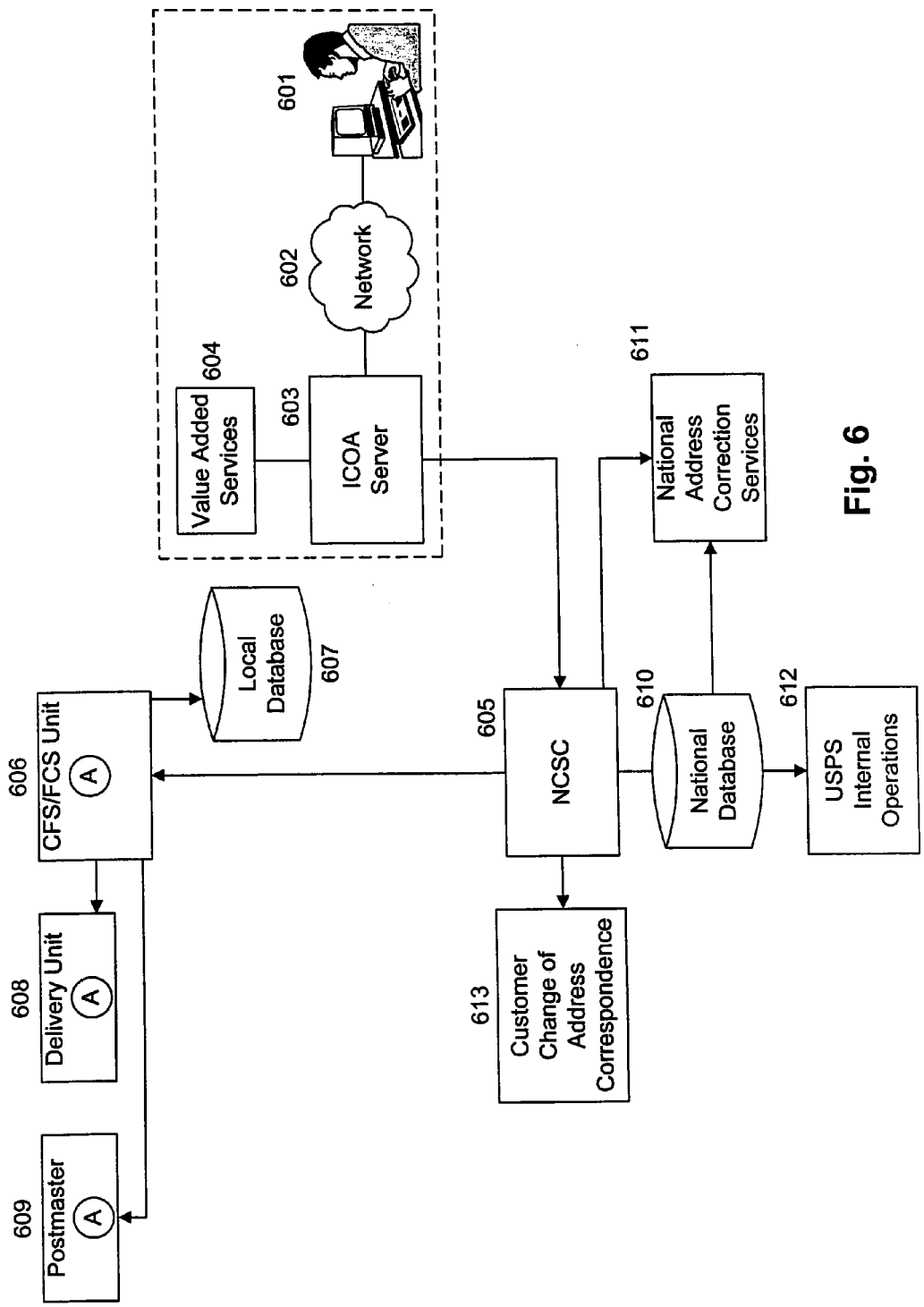
FIG. 6 is a block diagram illustrating a customer change of address system consistent with an embodiment of the present invention.

FIG. 6 is a block diagram illustrating a customer change of address system consistent with an embodiment of the present invention. The system may include a postal customer (601), a network (602), an Internet Change of Address (ICOA) Server (603), Value Added Services (604), a Postmaster for the area of the old address A (609), a delivery unit for address A (608), a Computerized Forwarding System (CFS) unit for address A (606), a local database for address A (607), a National Customer Support Center (NCSC) (605), customer change of address correspondence (613), a national database (610), national address correction services (611), and USPS internal operations (612). FIG. 6 depicts a postal customer (601) arriving at ICOA server (603) via network connection (602). Value added services (604) may be offered from a separate entity (as shown) or may be incorporated within the ICOA server (603). Value added services (604) may include connected services described in greater detail below with respect to FIG. 12.

Similarly, ICOA server (603) may be incorporated within NCSC (605) or alternatively may be located in a separate USPS data facility (as shown) with a connection to NCSC (605). Customers electronically provide change of address information (i.e., to change a physical address and/or an e-mail address) over network (602) to ICOA server (603). ICOA server (603) captures and transmits this information as necessary throughout the system to execute the various features and functions described later.

Fundamentally, ICOA server provides change of address information (i.e., physical address data and/or e-mail address data) to NCSC (605), and NCSC transmits the data throughout the system to CFS/FCS unit (606), national address correction services (611), national USPS databases (610), other USPS internal operations (612), and customer change of address correspondence (613). NCSC routes physical change of address data through a download operation to the CFS/FCS unit (606) that services the address from which the customer is moving (address A). CFS/FCS unit (606) is one of a multitude of computer system sites located across the continental United States, Alaska, Hawaii and Puerto Rico. CFS/FCS unit (606) automatically downloads the transmitted information and stores it in a local database (607). The CFS unit uses the change of address information to provide hard copy change of address notifications on physical mail pieces and forwarding undeliverable mail pieces.

CFS unit (606) then sends the change of address information to a delivery unit (608) and the postmaster (or Post Office) (609) that services the customer's old address A. When the change of address information reaches the local level (address A), the Postal Service can conduct address notification and forwarding operations at the local level. By capturing and processing change of address information completely electronically, the USPS avoids the laborious hard copy data entry operation. Thus, the ICOA system of the USPS achieves tremendous savings both in cost and processing time, thereby providing information more quickly to the USPS, the mailing community, and various entities therein.

NCSC also routes the change of address information to national address correction services (611), USPS national databases (610), customer change of address correspondence (613), and other USPS internal operations systems (612). The customer change of address correspondence (613) may include a move validation letter (MVL), a customer notification letter (CNL), and a Welcome Kit™ generation activities. The ICOA system provides an additional channel for change of address information to reach all the systems depicted in this diagram. Unlike the traditional hard copy change of address cards as explained above, the ICOA system allows information to come in via a network, e.g., the Internet, at a much lower cost and with a higher degree of efficiency while enabling a wide variety of value added services for moving customers.

Figure 7:
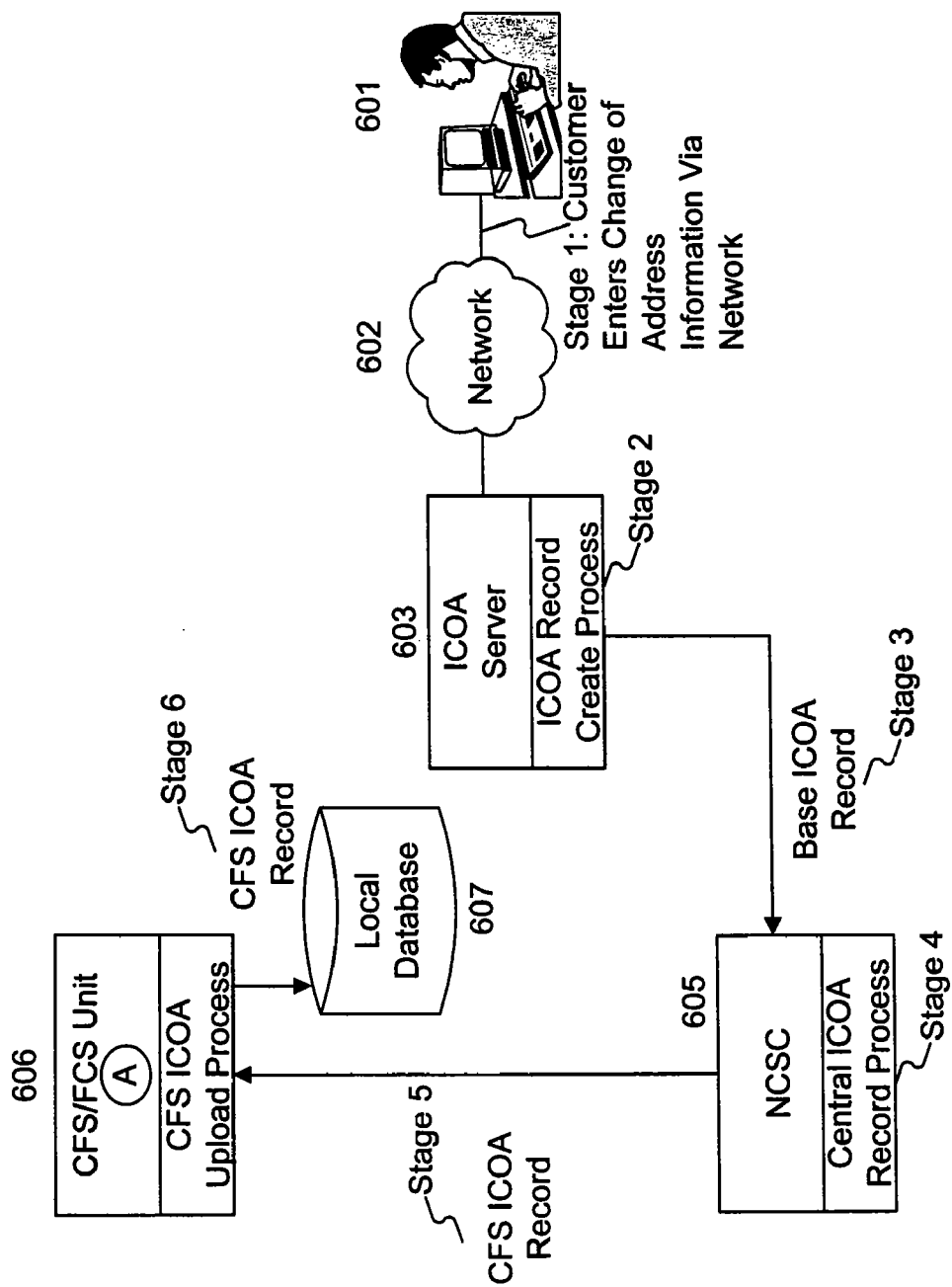
FIG. 7 is a flow chart relating to uploading change of address information into the local database of the CFS unit, consistent with an embodiment of the present invention.

FIG. 7 is a flow chart relating to uploading change of address information into the local database of the CFS unit, consistent with an embodiment of the present invention. In stage 1, the customer enters change of address information via a network (602) into the ICOA server (603). In stage 2, an ICOA base record is created by the ICOA record create process on the ICOA server (603). In stage 3, the base ICOA record is sent to the NCSC (605), where a central ICOA record process would ensue upon the base ICOA record. In the central ICOA record process, the base ICOA record is modified and sorted as needed for uploading to the appropriate CFS site. In stage 5, the resulting CFS ICOA record is transmitted to the appropriate CFS unit and a CFS ICOA upload process occurs to automatically upload the CFS ICOA record into the local database.

Figure 8:
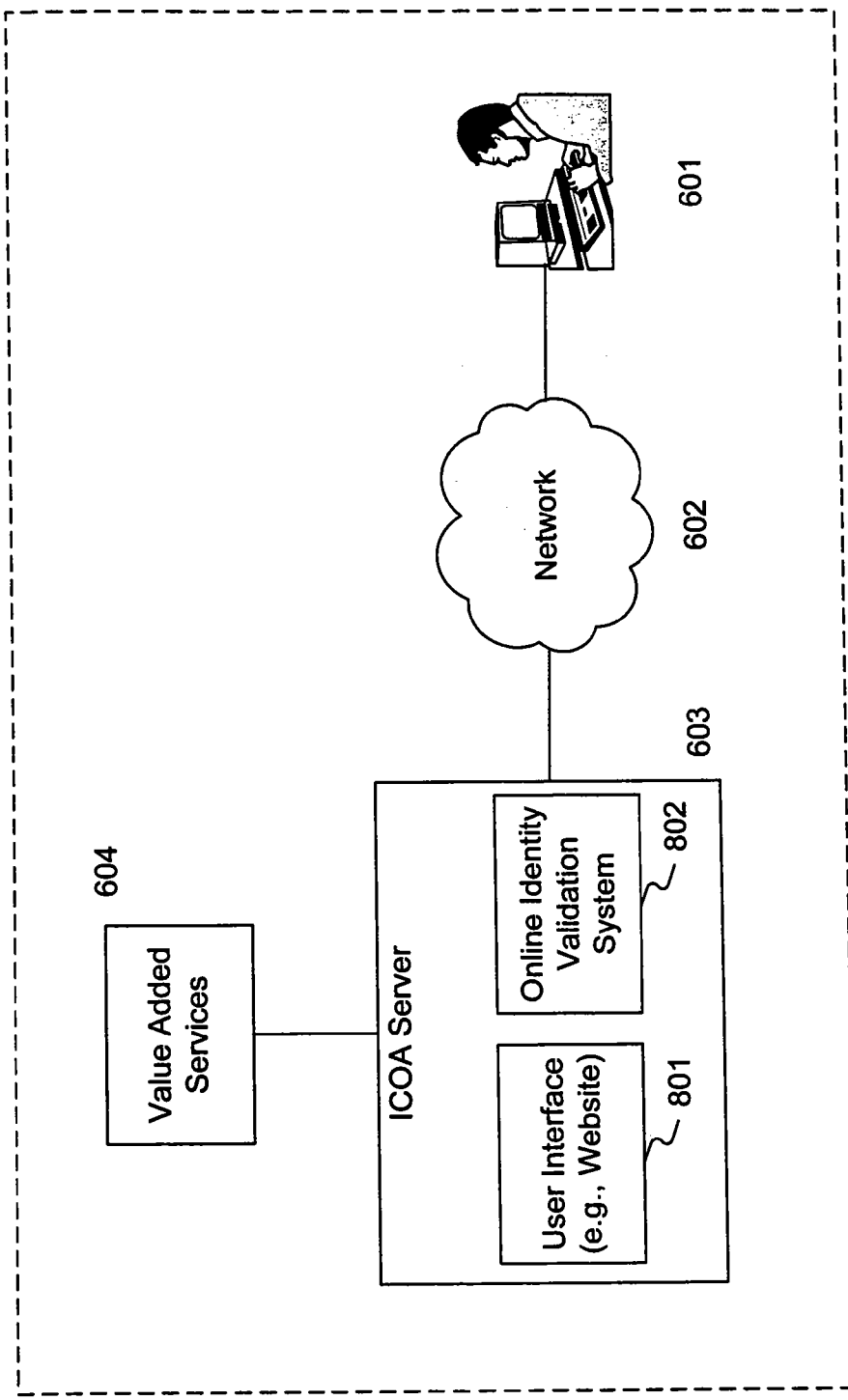
FIG. 8 is a block diagram illustrating the ICOA server, consistent with an embodiment of the present invention.

FIG. 8 is a block diagram illustrating ICOA server (603), consistent with an embodiment of the present invention. FIG. 8 shows that ICOA server (603) may comprise a user interface (801) and an Online Identity Validation System (802) for filing a change of address over the Internet. User interface (801) is a web site that customer (601) encounters upon arriving at the ICOA server via network (602). User interface (801) may include a set of graphical interfaces and text that are created as appropriate to allow the customer to navigate the Website, provide change of address information, and select features and services. First and foremost, user interface (801) enables the user to file an electronic change of address via the ICOA system. The Online Identity Validation System (802), which is further defined below in FIG. 10, enables a completely online process and helps protect customers against fraudulent changes of address.

Figure 9:
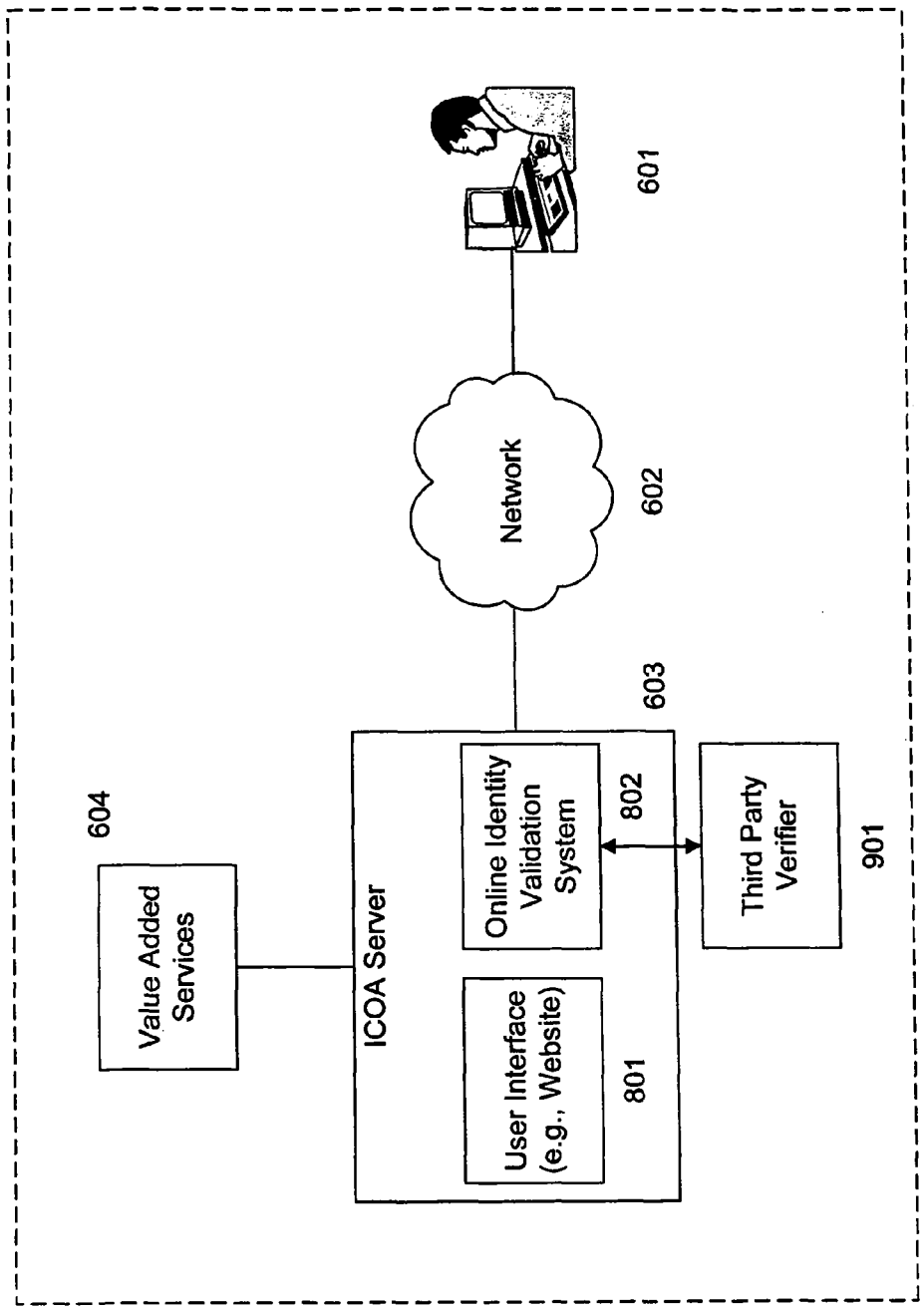
FIG. 9 is a block diagram illustrating the ICOA server, consistent with another embodiment of the present invention.

FIG. 9 is a block diagram illustrating the ICOA server, consistent with another embodiment of the present invention. In this embodiment, the Online Identity Validation System (802) may use a third party verifier (901) to validate a customer's identity rather than having a wholly internal USPS function as shown in FIG. 8. For example, a credit card based identity validation process could involve a third-party credit card company, as described below with reference to FIGS. 11 and 12.

Figure 10:
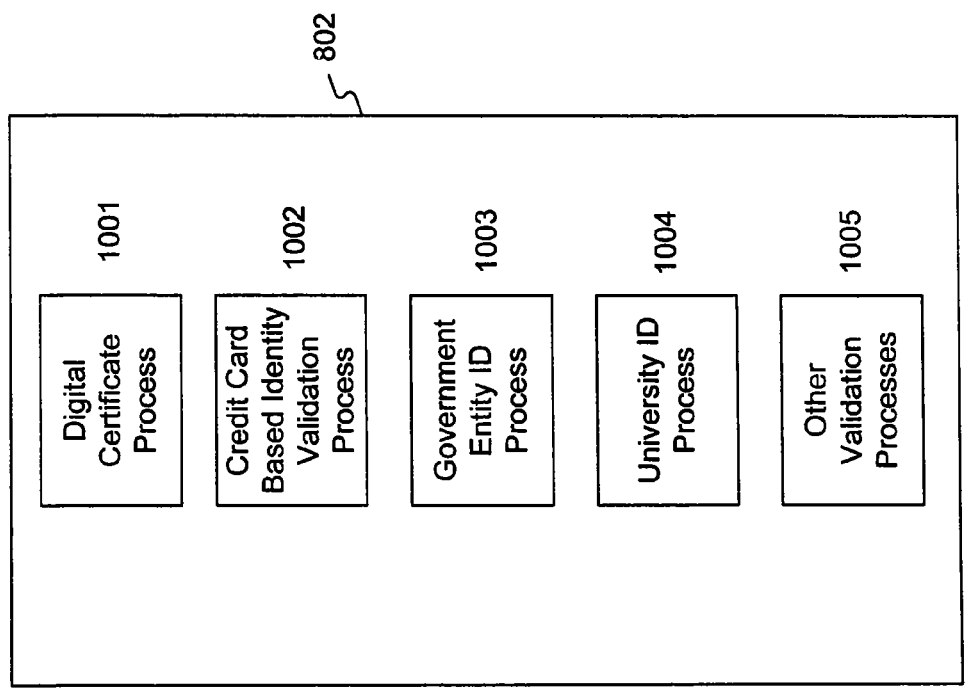
FIG. 10 is a block diagram illustrating an Online Identity Validation System, consistent with an embodiment of the present invention.

FIG. 10 is a block diagram illustrating an Online Identity Validation System, consistent with an embodiment of the present invention. As shown in FIG. 10, Online Identity Validation System (802) may include a digital certificate process (1001), a credit card based identity validation process (1002), a government entity ID process (1003), a university ID process (1004), and other validation processes (1005). Each of the above items may be used alone or in combination to perform an identity validation process. For example, digital certificate process (1001) is a Public Key Infrastructure (PKI) based digital certificate that the ICOA server may use to validate the identity of the individual who is filing a change of address. The digital certificate may be issued by the USPS or, alternatively, provided by another vendor. The USPS would recognize whether the digital certificate presented by the customer is one that is valid and recognized by the USPS as authorized for this purpose.

Rather than comparing a stored digital certificate to identify a customer, the ICOA system may compare credit card information entered by the customer using credit card based identity validation process (1002) (described in more detail below with reference to FIG. 11). Additionally, a government identification using an approved government identity ID process (1003), an approved university identification using university ID process (1004), or other validation processes (1005) may be used to validate a customer's identity. Examples of government entity ID process (1003) may include the Social Security Administration knowledge based system, a veterans identification system, or other systems that identify a person using government information or a series of government information. University ID process (1004) is a process that the Postal Service may initiate with major universities in the United States. The University ID process may obtain student ID numbers, issued by the universities, from an interrogation of a school's files. The University ID process may accept code words and the student IDs to validate a personal identity. One skilled in the art can readily appreciate that a whole spectrum of other validation processes (1005) may be available in the future for the ICOA system to use for identity validation. For example, other validation processes could include retinal scans, biometric processes, etc.

Figure 11:
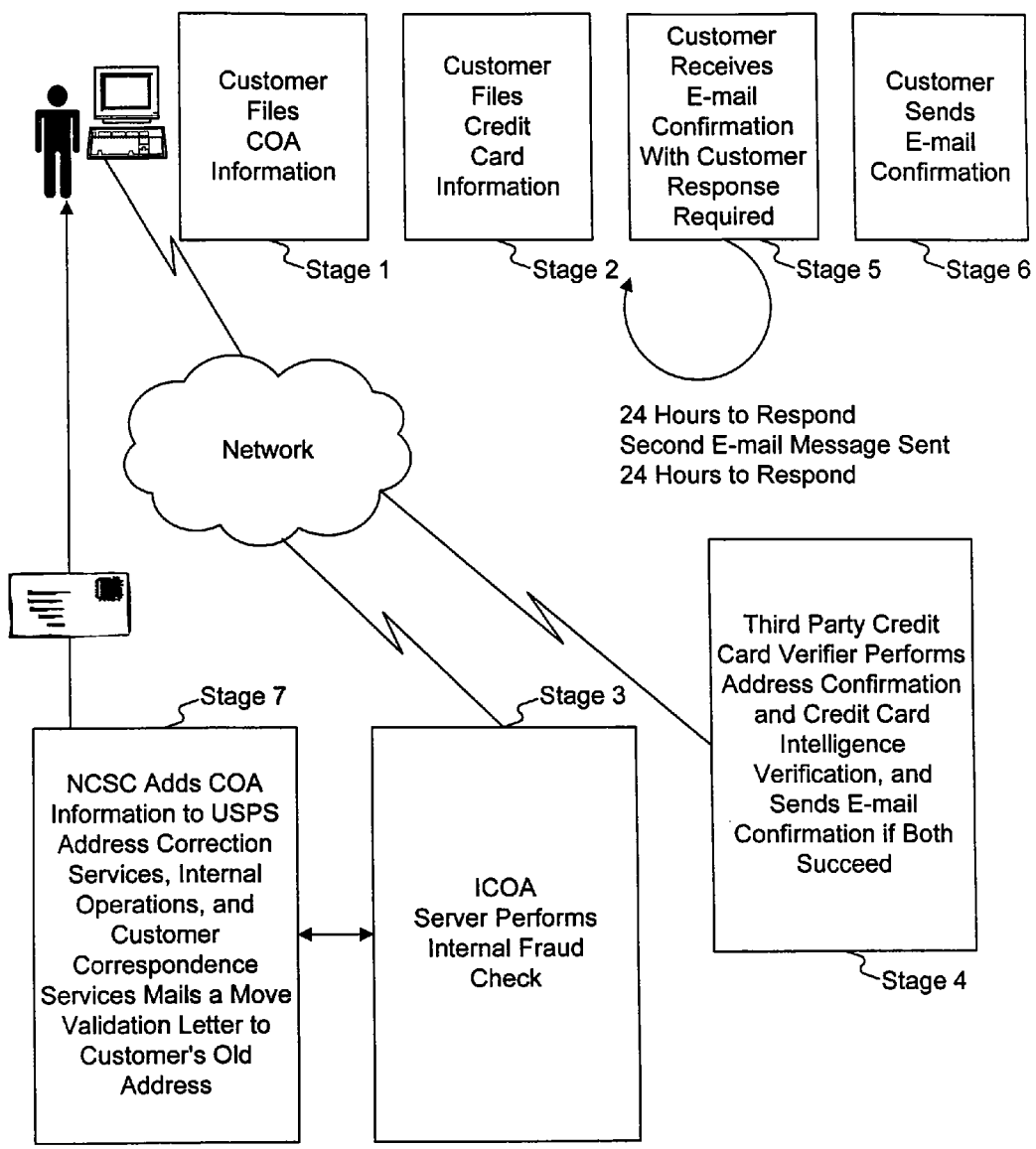
FIG. 11 is a flow chart relating to processing a credit card based identity validation, consistent with an embodiment of the present invention.

FIG. 11 is a flow chart relating to processing a credit card based identity validation process, consistent with an embodiment of the present invention. In stage 1, a customer files change of address information by entering the information with a personal computer and submitting it to the ICOA system over a network, such as the Internet. This information may include the following: name, old address or the address from which the customer is moving, new address or the address to which the customer is moving, the effective date of the move, the move type, whether the move is permanent or temporary, and whether the move is for an individual, a family or a business.

In stage 2, the customer may submit the following credit card information to the ICOA system over the Internet: billing address, credit card name, credit card type, account number, the expiration date, and e-mail address. If the customer chooses not to enter or submit their change of address information via the Internet by entering credit card information, then the customer may complete the PS Form 3575WWW on a computer connected to a PS Form Server 3575WWW via a network. As before, the customer may print and execute the completed form, and mail or hand carry it to a local Post Office.

In stage 3, the ICOA server compares the information entered in stage 2 to an internal fraud database residing on the server. The internal fraud database may be built over time to include the credit card numbers of credit cards that have been used fraudulently. In stage 4, the ICOA system performs credit card address verification and credit card intelligence verification through a third party credit card verifier. For credit card address verification, the third party credit card verifier provides information to the ICOA server indicating whether the billing address entered by the customer matches the address on file with the third party credit card verifier. For the credit card intelligence verification, the third party credit card verifier returns a code to the ICOA server indicating whether credit card is valid. Specifically, the third party credit card verifier uses a credit card based identity validation system comprising artificial intelligence and an algorithm to verify the credit card information. If both the credit card address verification and the credit card intelligence verification succeed, the third party credit card verifier sends a confirmation to the ICOA server.

If the internal fraud check, the credit card address verification, and the credit card intelligence verification all succeed, then in stage 5, the ICOA server sends an e-mail confirmation notification to the customer using the e-mail address provided by the customer in stage 2. The ICOA system requires a customer response within 24-hours of receipt of the notification. If the customer does not respond within the specified time, then the ICOA system sends a second notification, giving the customer an additional 24-hours to respond. If the customer responds by sending a customer e-mail confirmation (stage 6), then the change of address is accepted and added to the Postal Service address correction services and other internal operations in stage 7. Otherwise, if the customer does not respond to either of the two e-mail notifications, then the change of address request is not accepted.

In stage 7, the NCSC sends the change of address information throughout the ICOA system. Specifically, NCSC sends the change of address information to the customer change of address correspondence system. The customer change of address correspondence system mails a move validation letter to the old address or the address from which the customer is moving. NCSC also adds the change of address information to the Postal Service national address correction services and the USPS internal operations.

Figure 12:
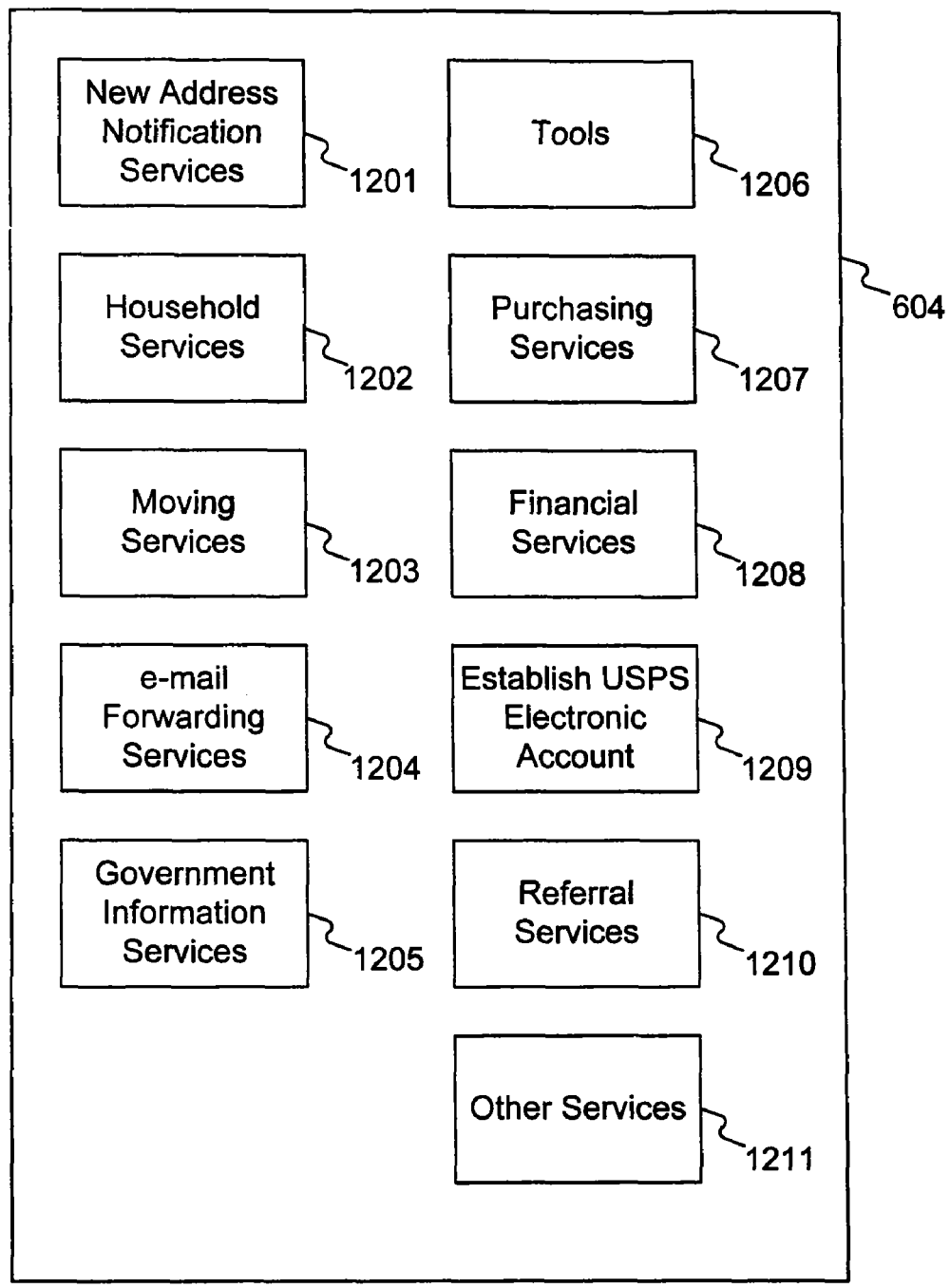
FIG. 12 is a block diagram illustrating the Value Added Services, consistent with an embodiment of the present invention.

FIG. 12 is a block diagram illustrating the Value Added Services, consistent with an embodiment of the present invention. As shown in FIG. 12, Value Added Services (604) of FIG. 6 may include new address notification services (1201), household services (1202), moving services (1203), e-mail forwarding services (1204), government information services (1205), tools (1206), purchasing services (1207), financial services (1208), establish USPS electronic account (1209), referral services (1210), and other services (1211). New address notification services (1201), described in more detail later, allow customers to provide individual addresses or address lists, so that notifications can be provided to those listed. Household services (1202) may include notifying local and long distance phone services, cable services, utility companies, or subscriptions to newspapers or magazines to begin or stop service at a particular address. Moving services (1203) may include various moving services, such as ordering packing supplies or scheduling a moving truck. E-mail forwarding services (1204), which will be described later, allow a customer to forward e-mail to a new electronic address. Government information services (1205) may provide government information for a geographical area to customers. For example, customers may use government information services (1205) to gather forms or information on voter registration in a new area, or information on Department of Motor Vehicle for registration of their vehicles.

Tools (1206) may include various tools, such as an electronic furniture arranger and a week-by-week moving timeline. Purchasing service (1207) may include a service for making any purchases, such as pet supplies or furniture. The purchasing service may deliver the purchases to the customer at the new address or the old address. Financial services (1208) may include online banking services and other financial services. Establish USPS electronic account (1209), which will be described later, allows customers to create an electronic account with the U.S. Postal Service. Referral service (1210) may include a service for making any referral for a geographical area. Examples of possible referrals may include doctor referrals, contractor referrals, etc. One skilled in the art will readily appreciate that other services (1211) may also be provided to assist a customer in all aspects of moving to a new address.

For example, in one embodiment, other services (1211) may include a service for re-establishing contact with a customer who has moved. The contact re-establishment service may include a database of archived change of address information that spans several years. After receiving a request from a user to re-establish contact with a customer who has moved, the service may search the database for the most current electronic or physical address for the customer who has moved. The service then may forward an electronic or hardcopy message to the customer at that address containing the user's contact information (such as an electronic or physical return address). Thus, the customer who has moved may choose to contact the user or retain his privacy.

Another value added service may include a contact establishment service. The contact establishment service allows a commercial entity to forward electronic advertising mail messages to aggregate regionally selected customers who have moved. The electronic advertising mail message may include a reply address and an option of selecting whether to receive subsequent messages. This option may be offered to the customer for selected companies or for a collective group of companies. Alternatively, the customer may indicate on a change of address request, for example, whether he wants to receive electronic advertisements from a particular company or group of companies.

Figure 13:
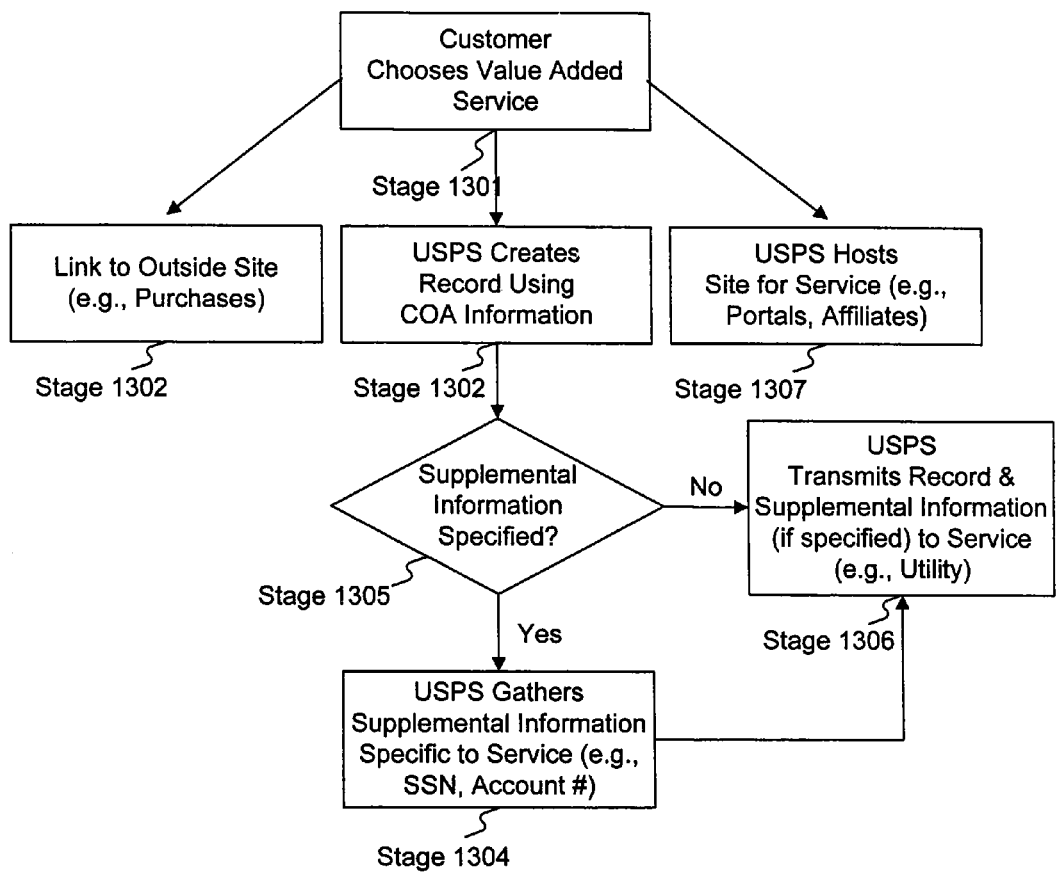
FIG. 13 is a flow chart of the various methods for offering value added services to a customer, consistent with an embodiment of the present invention.

FIG. 13 is a flow chart of the various methods for offering value added services to a customer, consistent with an embodiment of the present invention. In one method for offering value added services, the ICOA server may link the customer to an outside web site or other location via the network (stage 1302) when the customer chooses a value added service (stage 1301). For example, the customer could be linked to a web site selling furniture or moving supplies. In another method, if the customer chooses, the ICOA server may create a record (stage 1303) using the change of address information. The ICOA server, if needed, may collect any supplemental information (stage 1304) (e.g., social security number, account number, etc.) specified by the service (stage 1305) and then transmit the record and the supplemental information to the service, e.g., a utility company (stage 1306). In yet another alternative method, the ICOA server may host a web site on behalf of a service (e.g., portals, affiliates, etc.) (stage 1307).

Figure 14:
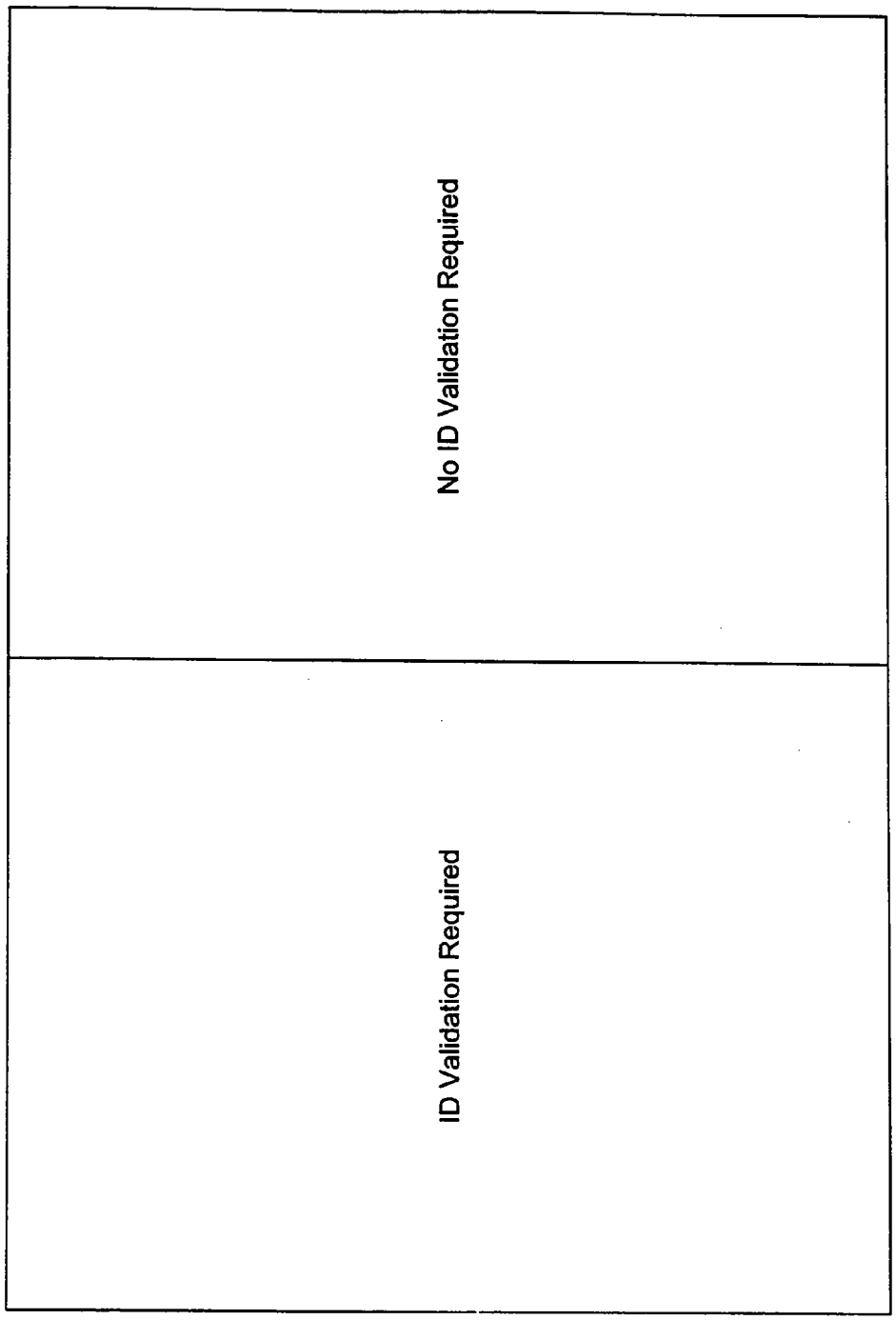
FIG. 14 is a diagram illustrating aspects of value added services.

FIG. 14 is a diagram illustrating aspects of value added services. As shown in FIG. 14, some value added services can be offered to a customer only after the customer's identity is validated, or, alternatively, that certain value added services can be offered regardless of identity validation.

Figure 15:
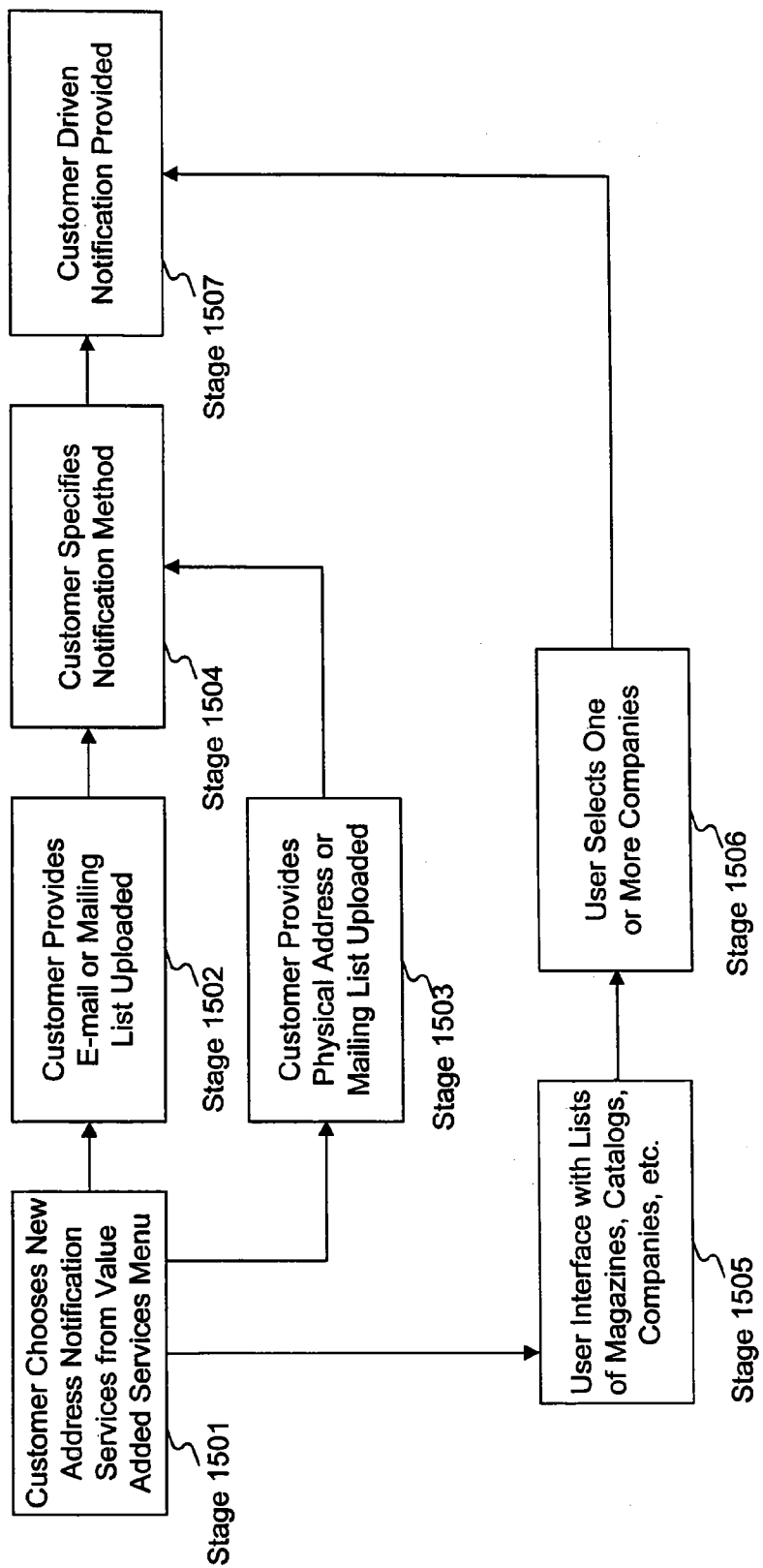
FIG. 15 is a flow chart relating to new address notification services from the value added services menu, consistent with an embodiment of the present invention.

FIG. 15 is a flow chart relating to new address notification services from the value added services menu, consistent with an embodiment of the present invention. If a customer chooses the new address notification services from the value added services menu (stage 1501), the customer may provide the addresses for recipients the customer wishes to be notified and/or select the recipients from a pre-determined list of recipients, e.g., magazines, catalogs, etc. If the customer chooses to provide the recipient names and/or addresses, the addresses can be either electronic addresses (stage 1502), e.g., e-mail addresses, or physical addresses (stage 1503). The customer could also upload a mailing list of names and/or addresses (i.e., electronic address or physical addresses). The customer can also specify a notification method for each recipient (stage 1504), such as electronic notification or notification by mail. Additionally, a user interface could be presented to the customer listing pre-selected companies (stage 1505) and the user could indicate one or more of the pre-selected companies to be notified (stage 1506), e.g., using radio buttons or drop-down lists. After selecting all of the recipients to be notified, customer driven notification is provided (stage 1507), as shown in FIGS. 16 and 17.

Figure 16:
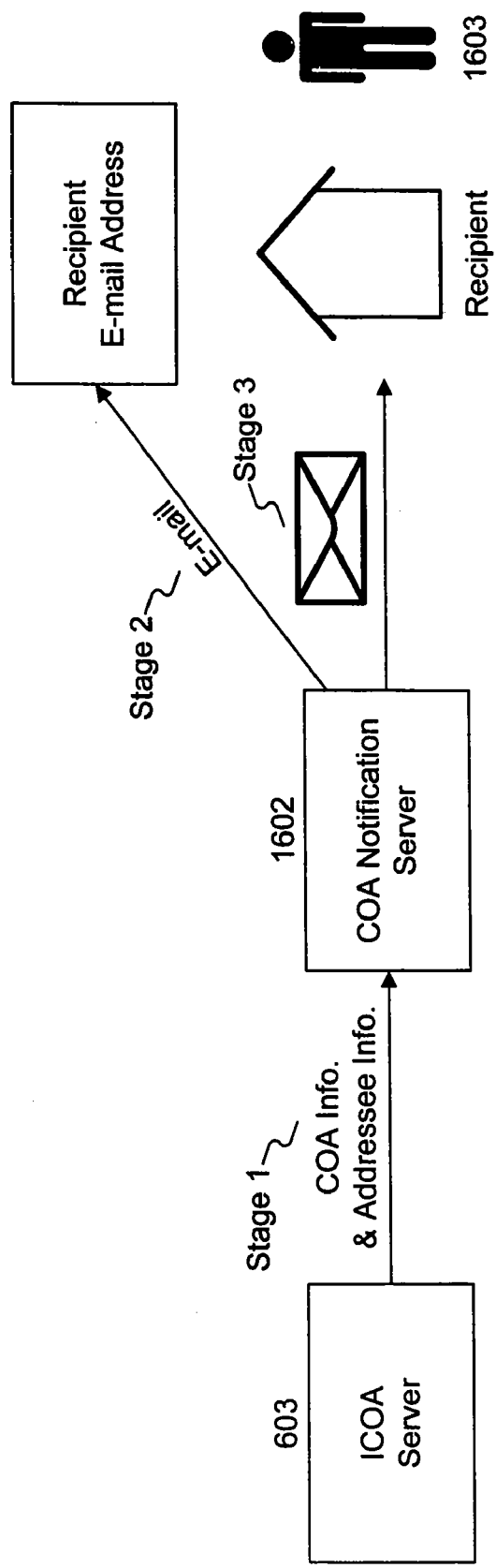
FIG. 16 is a flow chart relating to providing a customer driven notification system, consistent with an embodiment of the present invention.

FIG. 16 is a flow chart relating to providing a customer driven notification system, consistent with an embodiment of the present invention. As shown in FIG. 16, a customer driven notification system from the value added services may include ICOA server (603), a change of address notification server or service (1602), and a recipient of the notification (1603). ICOA server (603) is the same ICOA server described earlier. Change of address (COA) notification server (1602) may be located on the ICOA server or may exist as a separate bank of servers. Alternatively, COA notification server may be a separate service, for example, the U.S. Postal Service Mailing Online hybrid mailing service, or a separate contractor that prints the mail piece notifications and/or configures and sends e-mail notifications. Recipient (1603) may include multiple recipients.

In stage 1, the ICOA server sends the change of address information and the recipient address information entered by the customer in the ICOA system to the COA notification server or service (1602). The COA notification server may send an e-mail notification to the recipient's e-mail address (stage 2) or a physical mail piece notification to the physical address of the recipient (stage 3).

Figure 17:
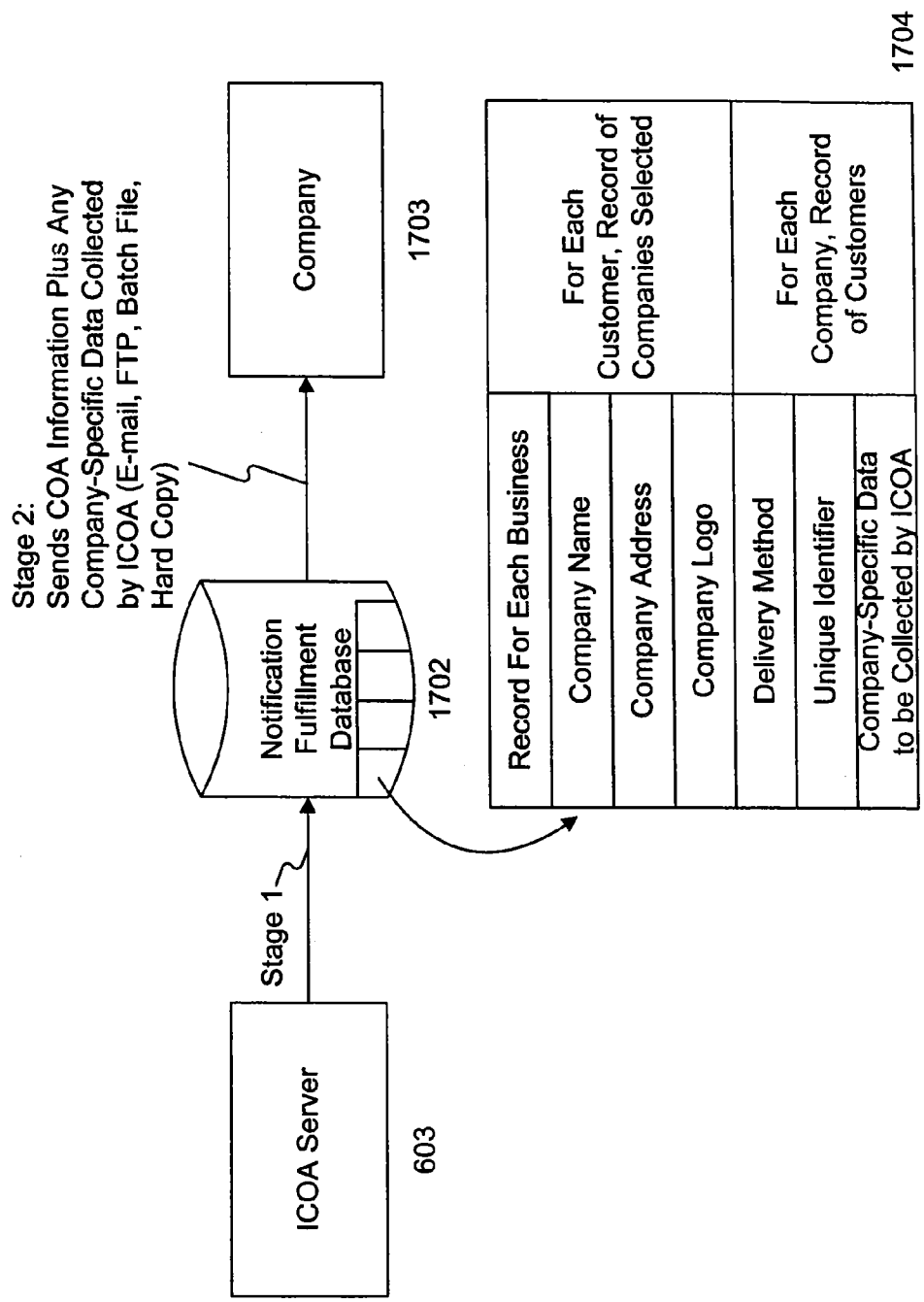
FIG. 17 is a flow chart relating to selecting recipients from a pre-constructed list presented by the ICOA interface in a customer driven notification system, consistent with an embodiment of the present invention.

FIG. 17 is a flow chart relating to selecting recipients from a pre-constructed list presented by the ICOA interface in a customer driven notification system, consistent with an embodiment of the present invention. As shown in FIG. 17, a customer driven notification system may include ICOA server (603), a notification fulfillment database (1702), a company (1703), and a record (1704). Notification fulfillment database (1702) may be located on ICOA server (603) or COA notification server (1602) described in FIG. 16. Notification fulfillment database contains records for all of the companies (e.g., various catalogs, magazines, companies, etc.) that have been listed on the graphical user interface (801) for a customer's possible selection. Company (1703) represents a recipient company that will receive the notification. Record (1704) shows in some detail the construction of the specific record that identifies company (1703).

In FIG. 17, the ICOA server sends a selection record to the notification fulfillment database (stage 1). The selection record contains a record of the customer selections from the pre-determined list of companies displayed by the graphical user interface. From the selection record, notification fulfillment database may identify and tag the companies to be notified and route notification records as appropriate. To identify and tag the companies, the database may assign a unique identifier to each company. Further, to route the notification records, the database may assign to each company any company-specific data needed to enable the notifications. Stage 2 shows the database sending the notifications to the company via, e.g., e-mail, FTP, batch file, hard copy, standard Internet protocol, XML, etc. Notification may or may not be an encrypted form as needed.

Figure 18:
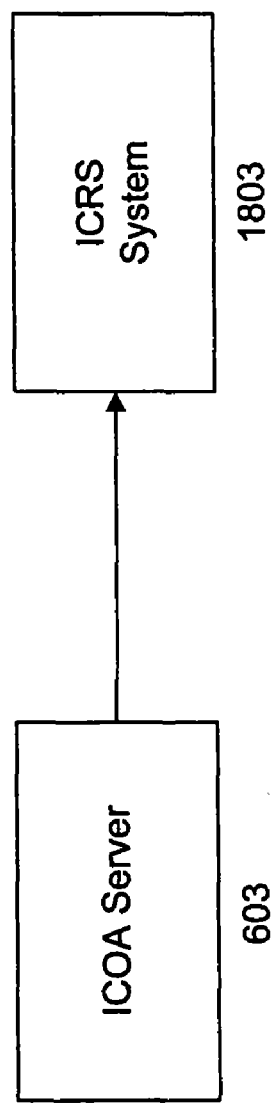
FIG. 18 is a block diagram illustrating an additional value added service, a customer establishing a personal USPS electronic account or virtual account, consistent with an embodiment of the present invention.

FIG. 18 is a block diagram illustrating an additional value added service, a customer establishing a personal USPS electronic account or virtual account, consistent with an embodiment of the present invention. As shown in FIG. 18, a system for establishing a personal USPS electronic account may include ICOA server (603) and an Internet Customer Registration System (ICRS) (1803). ICRS (1803) is a separate U.S. Postal Service initiative. As part of the value added services, the ICOA server (603) and the graphical interface (801) therein (described above in FIG. 8) may offer the customer the opportunity to have a personal USPS electronic account established after the customer has conducted their primary business on the ICOA platform. The establishment of this USPS electronic account would open an entire suite of electronic services. The ICOA server (603) may create a data record with the customer-specific information previously provided and transmit it to ICRS (1803). ICRS (1803) then may interact with the customer directly to establish an USPS account. The customer may also submit a request for a change of address from an old address to a new address and utilize the value added services via the ICRS system to the ICOA server.

Figure 19:
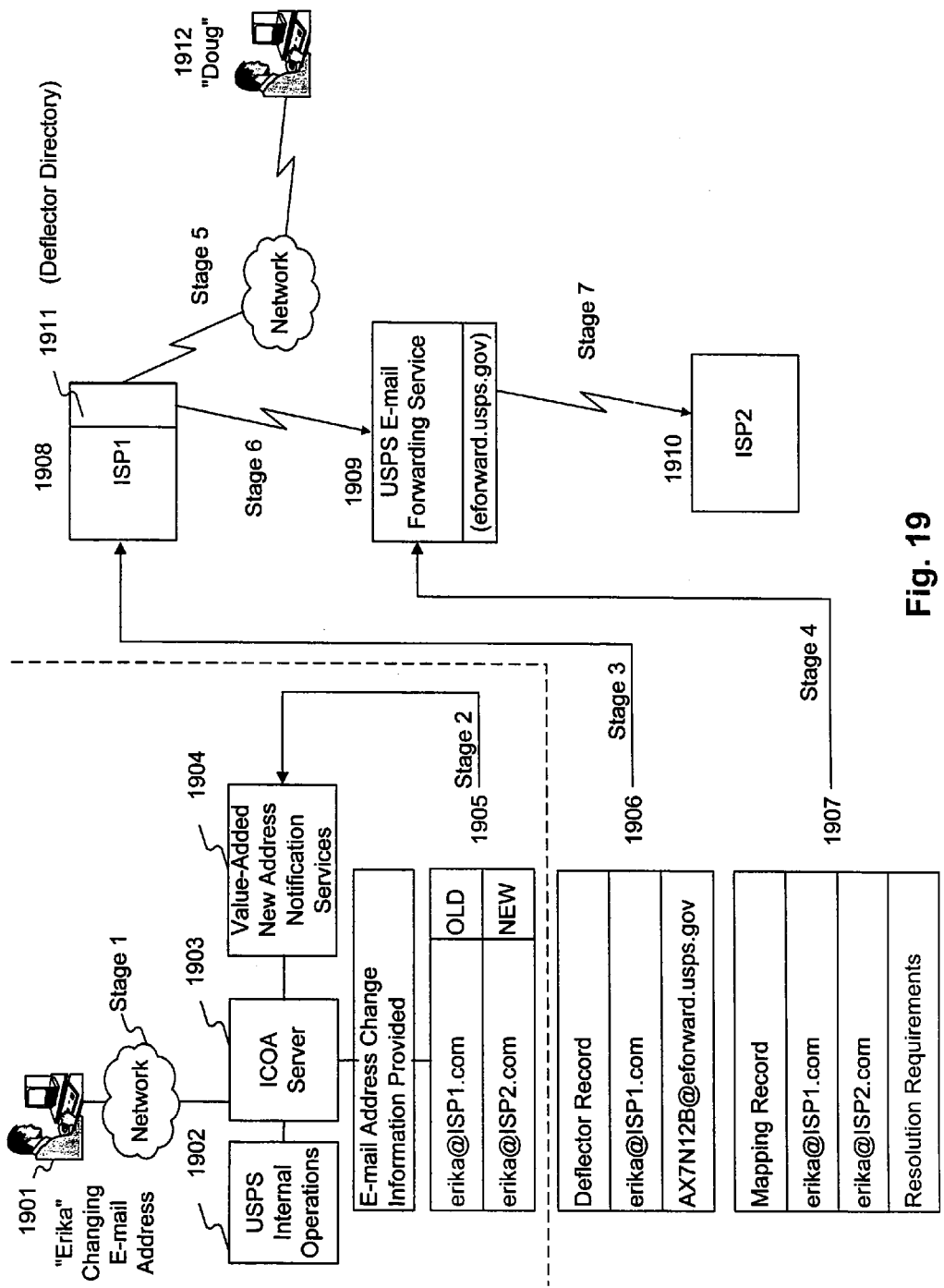
FIG. 19 is flow chart relating to performing a value-added e-mail forwarding service, consistent with an embodiment of the present invention.

FIG. 19 is flow chart relating to performing a value-added e-mail forwarding service, consistent with an embodiment of the present invention. As shown in FIG. 19, the value added e-mail forwarding service may include, in part, a customer (1901) named Erika, USPS Internal Operations (1902), USPS Internet Change of Address (ICOA) server (1903), Value-Added New Address Notification Services (1904), old and new service provider record (1905), deflector record (1906), mapping record (1907), old e-mail service provider (1908), deflector directory (1911), USPS e-mail forwarding service (1909), and ISP2 (1910). ICOA server (1903) may consist of one or multiple computer systems. USPS Internal Operations (1902), USPS Internet Change of Address (ICOA) server (1903), Value-Added New Address Notification Services (1904), and USPS e-mail forwarding service (1909) are described above using different reference numerals.

Erika (1901) provides the required information to the ICOA server via the network to change her e-mail address. Erika (1901) may or may not be changing her physical address also. After receiving the required information from Erika, the ICOA server creates three basic levels of records: 1.) old and new service provider record (1905), 2.) deflector record (1906), and 3.) mapping record (1907).

Old and new service provider record (1905) identifies the old e-mail service provider and the new e-mail service provider (e.g., a from and to address or an old and new address). Deflector record (1906) contains the address of the old e-mail address provider and a specific address at a USPS e-mail forwarding service, in this case, identified as AX7N12B@eforward.usps.gov. Mapping record (1907) contains both the old and new e-mail service providers along with any resolution requirements that would be needed to provide information from one to the other.

Old e-mail service provider (1908), here ISP1, is the e-mail service provider at the e-mail address from which the customer is moving. USPS e-mail forwarding service (1909) has an exemplary address of eforward.usps.gov. This service may include multiple databases populated by subscribing e-mail services, in this case ISP1 and others. By subscribing to this service, e-mail services participate in a trusted third party forwarding service as a value added service to their e-mail customers. The subscribing e-mail services may participate to ensure that, when a customer signs on with them, as a value added feature the customer would not experience any disruption of service for a certain period of time should she choose to change services. The new e-mail service provider (1910), here ISP2, is the service provider that the customer Erika is moving to. Doug (1912) is another customer sending an e-mail message to Erika at her old e-mail address with ISP1.

In FIG. 19, stage 1 shows Erika, the customer, arriving at the ICOA site and providing the information to create the electronic records that reflect her e-mail change of address and additional support records that are needed, as described above. Stage 2 shows the ICOA server providing the basic information to the value added notification services. The value added new address notification services offer the customer value added new address notification services associated with an e-mail change of address, as described above. Stage 3 shows the ICOA server forwarding the deflector record to the old ISP1, where the information may be stored in a deflector directory at ISP1's site per a separate agreement between ISP1 and USPS. Stage 4 shows the ICOA server providing the mapping record information to the USPS e-mail forwarding service site.

At this point the ICOA system has updated the change of address information. Thus, when Doug attempts to send e-mail to Erika at ISP1 (stage 5), where she no longer has an account, the deflector directory (1911) re-routes the e-mail to USPS e-mail forwarding service (1909) (stage 6). There, the e-mail is processed to incorporate whatever resolution requirements there may be between ISP1 and ISP2. As shown in stage 7, the message is then routed on to ISP2, which is where Erika desires to receive e-mail.

The forwarding activity that occurs in stage 7, between e-mail forwarding service (1909) and ISP2 (1910) certainly may include any e-mail processing techniques known in the art. For example, this forwarding activity may include USPS electronic postmark to indicate when this activity took place. The forwarded message also may be encrypted in transit over a secure or non-secure connection, depending on the desired security requirements. Further, the message may be forwarded using various levels of services (such as the USPS electronic postmark or possible encryption), which are selected by the customer when filing the change of address request.

Although FIG. 19 represents the old and new e-mail service providers as ISP1 and ISP2, which denote Internet Service Providers (ISPs), the system is not limited to ISPs. The system may encompass any e-mail service provider on the network. The e-mail change of address feature is part of the ICOA change of address concept. The e-mail forwarding service would be one of the value added services that could be enabled by the USPS. The USPS, with its trusted third party status, could offer e-mail forwarding between ISPs who do not want to share their customer databases with one another and who wish to offer their customers a much-desired service to avoid disruption of the e-mail service when they change e-mail addresses. The provision of deflector records would be ISP-specific so as to keep the specific number of their customers changing from their service confidential from their competitors.

Figure 20A:
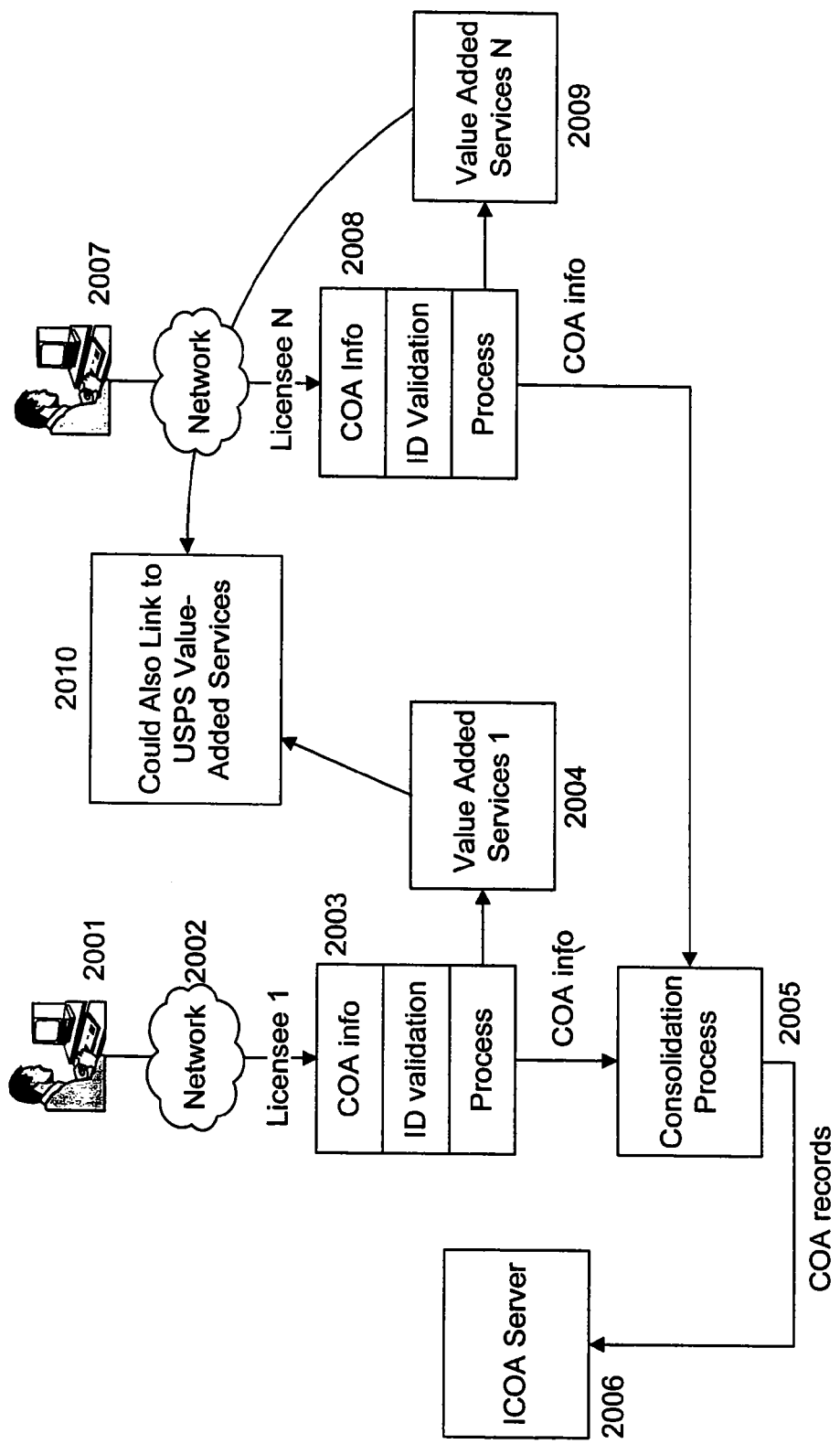
FIGS. 20A and 20B are block diagrams illustrating a change of e-mail address system, consistent with an alternative embodiment of the present invention.
Figure 20B:
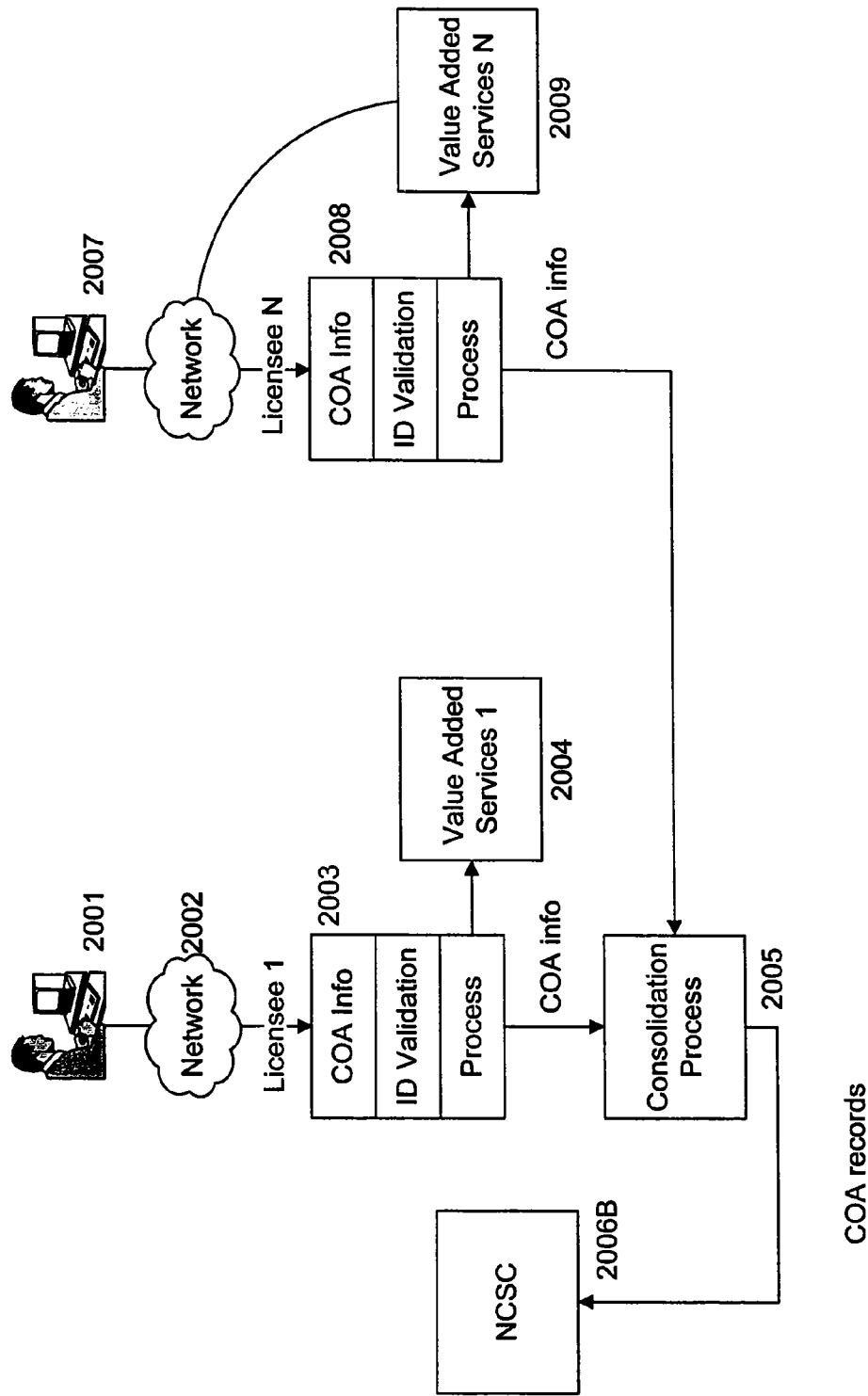

FIGS. 20A and 20B are block diagrams illustrating a change of e-mail address system, consistent with an alternative embodiment of the present invention. Rather than being solely a Postal Service function, the change of address system according to the alternative embodiment creates licensed agents to operate an ICOA-type system on behalf of the USPS. The change of address system provides the same basic functionality described earlier. The system also provides the change of address information to the Postal Service based on Postal Service specific requirements. Multiple entities may provide this service, either in addition to the Postal Service operating its own site (as shown in FIG. 20A) or without the Postal Service operating its own ICOA site (as shown in FIG. 20B) and leaving it entirely to the field of licensed agents to offer the service directly over the Internet. The change of address information may be provided under a license agreement executed by the Postal Service with the agent(s).

In FIG. 20A, the change of address system includes USPS ICOA server (2006), a postal patron (2001), network (2002), licensed agent site (2003), another postal patron (2007), another licensed agent site (2008), consolidation process (2005), value added services (2004), and other value added services (2009). ICOA server (2006) is the same server previously described in this application. Postal patron (2001) arrives via a network 1902 to ICOA licensed agent site, licensee 1, (2003) where ICOA information is provided and ID validation takes place. The licensee may offer a different set or the same set of value added services (2004) that are being offered by the ICOA site. The licensee may also link the customer to USPS value added services (2010) as a potential part of the license. The licensee sends the COA information to consolidation process (2005) where the information is forwarded to the USPS ICOA server (2006) in the proper format.

Various ICOA licensed agents may be used in the embodiment shown in FIG. 20A. For example, another postal patron (2007) may arrive at another and different ICOA licensed agent N (2008) via a network. Licensee N (2008) may collect ICOA information, provide ID validation, and provide ICOA information to the USPS-controlled consolidation process. Licensee N (2008) may offer a different array of value added services, value added services N (2009). Similarly, licensee N may also link into the USPS ICOA value added services.

In FIG. 20B, the change of address system includes a postal patron (2001), network (2002), licensed agent site (2003), another postal patron (2007), another licensed agent site (2008), consolidation process (2005), value added services (2004), other value added services (2009), and USPS national customer service center (NCSC) (2006B). NCSC (2006B) is the same national customer service center described earlier. The ICOA system of FIG. 20B differs from FIG. 20A in that the USPS does not run its own ICOA system. Therefore, the USPS does not run its own value added services and does not have an ICOA server. Accordingly, licensees, here licensee 1 (2003) and licensee N (2008) do not link the customer to any USPS value added services. Similarly, consolidation process (2005) sends the COA information to the USPS NCSC (2006B) (rather than the ICOA server) in the proper format.

Figure 21:
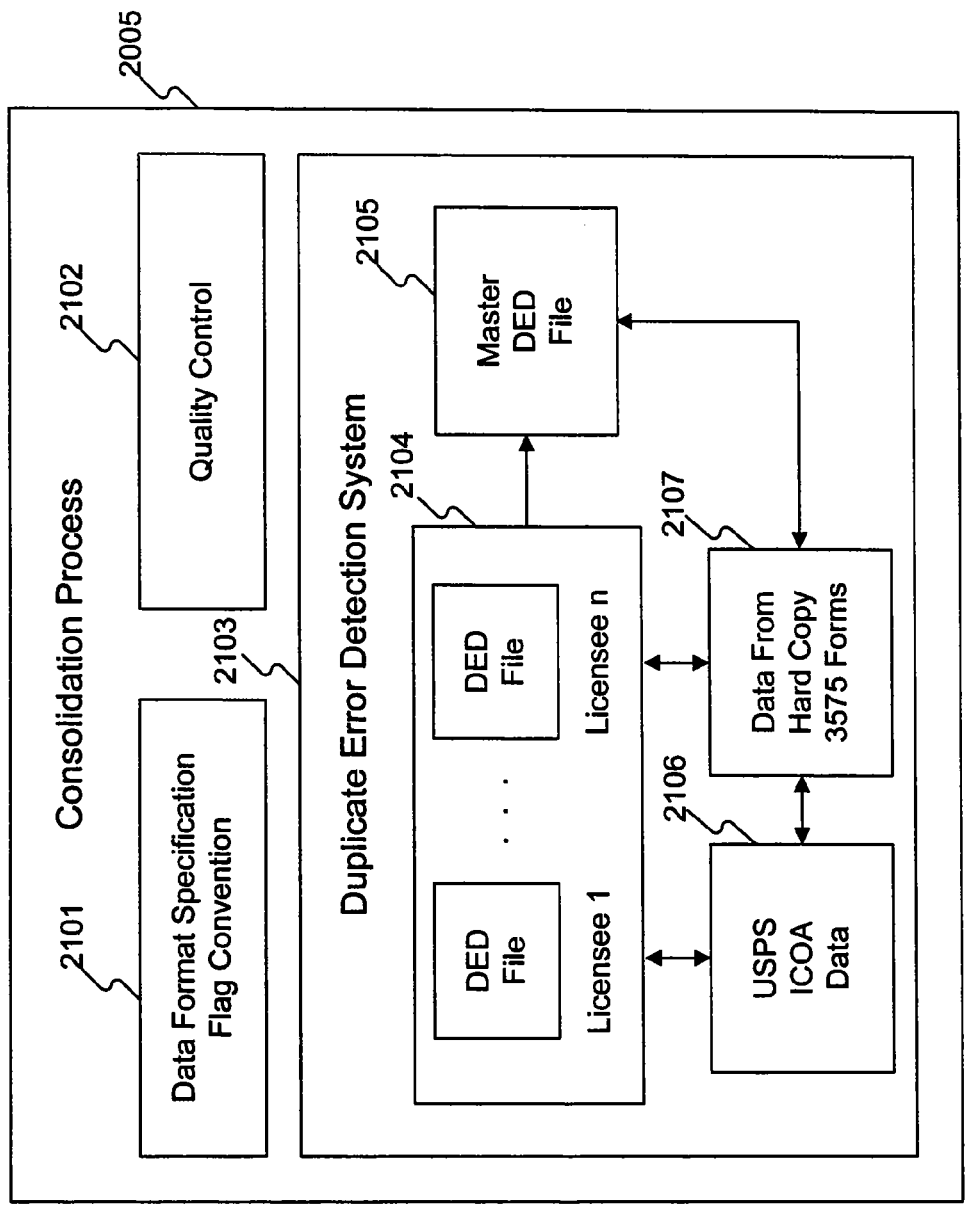
FIG. 21 is a block diagram illustrating the different subprocesses within the consolidation process shown in FIGS. 20A and 20B.

FIG. 21 is a block diagram illustrating the different sub-processes within the consolidation process shown in FIGS. 20A and 20B. As indicated in FIG. 21, consolidation process (2005) may include data format specifications and flagging conventions (2101), quality control (2102) and duplicate error detection system (2103). Licensed agents may provide data format specifications and flagging conventions (2101) into the consolidation process. The consolidation process may use the specifications and conventions to ensure that the data agrees with the USPS ICOA format requirements. Consolidation process (2005) also may perform a wide variety of quality control processes on the data to ensure that it is complete and correct. Quality control (2102) can determine whether the data has errors that computer software QC processes or random manual inspection of the data can detect.

Another function that could be provided by the consolidation process would be a duplicate error detection (DED) system (2103) to check whether the customer has filed a change of address form at multiple license sites. DED system constructs duplicate error detection files (2104) for each licensee and compares the files to each other. DED may also compare the duplicate files to the output data from the USPS ICOA server (2106), if one is provided, and to the data provided from the traditional hard copy 3575 data stream (2107) that exists today. DED system may compare the files for a finite period of time X, where X is any number of days (e.g., 15, 20, 30, 60). The consolidation process only forwards COA information that has not been duplicated in a master DED file (2105), thereby saving the Postal Service internal systems a great deal of difficulty for Postal Service internal systems in correcting these errors.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for providing an electronic change of address service from an old address of a customer to a new address of the customer, comprising:
    providing a user interface at a change of address server for the customer to enter change of address information and credit card information;
    receiving the change of address information and credit card information at the change of address server via a network;
    verifying an identity of the customer comprising determining whether the credit card information matches fraudulent credit card information stored on a database at the change of address server and verifying the identity when there is no match;
    sending an electronic message from the change of address server to the customer when the identity is verified;
    receiving a response from the customer at the change of address server confirming the change of address information;
    validating the identity when the response is received; and
    processing the change of address information electronically when the identity is validated to enable the customer to receive mail addressed to the old address of the customer at the new address of the customer.

2. The method of claim 1, wherein the credit card information includes at least one of a billing address, a credit card name, a credit card type, an account number, an expiration date, and an e-mail address.

3. The method of claim 1, wherein verification further comprises:
    sending the credit card information to a third party for verification; and
    receiving from the third party at the change of address server an indication that the identity of the customer is verified.

4. A system for providing an electronic change of address service from an old address of a customer to a new address of the customer, comprising:
    a network;
    a change of address server;
    a user interface at the change of address server for the customer to enter change of address information and credit card information;
    a change of address server interface for receiving the change of address information and credit card information at the change of address server via the network;

a verification component, comprising a component for determining whether the credit card information matches fraudulent credit card information stored on a database at the change of address server and verifying the identity when there is no match;

an electronic message sending component for sending an electronic message from the change of address server to the customer when identity is verified;

a customer interface for receiving a response from the customer confirming the change of address information;

a validation component for validating the identity when the response is received; and a change of address processor for processing the change of address information electronically when the identity is validated to enable the customer to receive mail addressed to the old address of the customer at the new address of the customer.

5. The system of claim 4, wherein the credit card information includes at least one of a billing address, a credit card name, a credit card type, an account number, an expiration date, and an e-mail address.

6. The system of claim 4, the verification component further comprising a credit card information sending component for sending the credit card information to a third party for verification, where the information is processed to verify an identity of the customer; and a third-party interface for receiving from the third party an indication whether the identity of the customer is verified.

7. A computer program product, stored on a non-transitory computer-readable medium that, when executed by a computer, provides an electronic change of address service from an old address of a customer to a new address of the customer, the computer program product comprising the following computer-readable program code for effecting actions in a computing platform:

program code for providing a user interface at a change of address server for the customer to enter change of address information and credit card information;

program code for receiving the change of address information and credit card information at the change of address server via a network;

program code for verifying an identity of the customer comprising program code for determining whether the credit card information matches fraudulent credit card information stored on a database at the change of address server; and program code for verifying the identity when there is no match;

program code for sending an electronic message from the change of address server to the customer when the information is valid;

program code for receiving a response from the customer after verification confirming the change of address information;

program code for validating the identity when the response is received; and program code for processing the change of address information electronically when the identity is verified to enable the customer to receive mail addressed to the old address of the customer at the new address of the customer.

8. The computer program product of claim 7, wherein the credit card information includes at least one of a billing address, a credit card name, a credit card type, an account number, an expiration date, and an e-mail address.

9. The computer program product of claim 7, the program code for verifying an identity of the customer further comprising:

program code for sending the credit card information to a third party for verification, where the information is processed to verify an identity of the customer; and program code for receiving from the third party an indication whether the identity of the customer is verified.

\* \* \* \* \*